(12) United States Patent
Asada et al.

(10) Patent No.: US 8,593,035 B2
(45) Date of Patent: Nov. 26, 2013

(54) PHASED ARRAY BUCKLING ACTUATOR

(75) Inventors: Haruhiko Harry Asada, Lincoln, MA (US); Devin Michael Neal, Somerville, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 439 days.

(21) Appl. No.: 12/942,447

(22) Filed: Nov. 9, 2010

(65) Prior Publication Data

US 2011/0109198 A1 May 12, 2011

Related U.S. Application Data

(60) Provisional application No. 61/259,873, filed on Nov. 10, 2009.

(51) Int. Cl.
  *H01L 41/08* (2006.01)
  *H02N 2/00* (2006.01)
  *H02N 2/04* (2006.01)

(52) U.S. Cl.
  CPC ...................... *H02N 2/043* (2013.01)
  USPC ........................................................ 310/328

(58) Field of Classification Search
  CPC ............................. H02N 2/043; H02N 2/046
  USPC ........................................................ 310/328
  See application file for complete search history.

(56) References Cited

U.S. PATENT DOCUMENTS

| 4,769,569 A | * | 9/1988 | Stahlhuth | 310/328 |
| 4,808,874 A | * | 2/1989 | Stahlhuth | 310/328 |
| 4,894,811 A | * | 1/1990 | Porzio | 367/174 |
| 4,976,553 A | * | 12/1990 | Yamaguchi et al. | 400/124.16 |
| 5,030,873 A | * | 7/1991 | Owen | 310/337 |
| 5,508,976 A | * | 4/1996 | Pauer | 367/159 |
| 6,294,859 B1 | * | 9/2001 | Jaenker | 310/328 |

(Continued)

FOREIGN PATENT DOCUMENTS

| JP | 2002354853 A | 12/2002 |
| KR | 20070072211 A | 7/2007 |
| KR | 100768513 B1 | 10/2007 |
| WO | WO 01/52400 | 7/2001 |

OTHER PUBLICATIONS

Anton, S., et al. "Vibration Energy Harvesting for Unmanned Aerial Vehicles," Proceedings of the SPIE, vol. 6928, pp. 692824-1-692824-12, 2008.

(Continued)

*Primary Examiner* — J. San Martin
(74) *Attorney, Agent, or Firm* — Pierce Atwood LLP; Steven M. Mills

(57) ABSTRACT

A harmonic buckling actuator includes buckling units engaged to a rotational track/gear. Each buckling unit includes two input actuators. One end of each input actuator is constrained to rotate about a rotational joint that is rigidly attached to a common ground. The other end of each input actuator is constrained to move with the other actuator of the same buckling unit along a single output axis via another rotational joint that is the output of the buckling unit. The inactivated, unforced configuration of each buckling unit is such that the input actuators are nearly collinear with the line segment connecting the unit's grounded rotational joints. The buckling units are arrayed around the track/gear such that their outputs are spatially phased within the groves of the track/gear. Harmonic activation of the buckling units generates torque on the track/gear about its output axis.

24 Claims, 17 Drawing Sheets

(56) References Cited

U.S. PATENT DOCUMENTS

| | | | | |
|---|---|---|---|---|
| 6,465,936 | B1* | 10/2002 | Knowles et al. | 310/328 |
| 6,717,333 | B2* | 4/2004 | Hermle et al. | 310/328 |
| 6,806,621 | B2* | 10/2004 | Heim et al. | 310/328 |
| 6,927,528 | B2* | 8/2005 | Barillot et al. | 310/325 |
| 7,227,295 | B2* | 6/2007 | Or et al. | 310/328 |
| 7,292,503 | B2* | 11/2007 | Butler et al. | 367/163 |
| 7,898,152 | B2* | 3/2011 | Stocker et al. | 310/328 |
| 8,154,173 | B2* | 4/2012 | Parker et al. | 310/328 |
| 8,159,114 | B2* | 4/2012 | Rahman et al. | 310/328 |
| 2012/0217845 | A1* | 8/2012 | Rahman et al. | 310/328 |

OTHER PUBLICATIONS

Avadhanula, S., et al., "Dynamically Tuned Design of the MFI Thorax," Proceedings of the IEEE International Conference on Robotics and Automation, Washington, D.C., pp. 1-8, 2002.

Challa, V., et al., "A Vibration Energy Harvesting Device with Bidirectional Resonance Frequency Tunability," Smart Materials and Structures, vol. 17, No. 1, pp. 15035+10, 2008.

De Doncker, R. W., et al., "A Three Phase Soft Switched High Power Density DC/DC Converter for High Power Applications," Industry Applications Society Annual Meeting, 1988., Conference Record of the 1988 IEEE, pp. 796-805, 1988.

Huber, J. E., et al., "The Selection of Mechanical Actuators Based on Performance Indices," Proceedings of the Royal Society London, A 453, pp. 2185-2205, 1997.

Issac, K. K., et al., "An Investigation Into the Use of Springs and Wing Motions to Minimize the Power Expended by a Pigeon-Sized Mechanical Bird for Steady Flight," Journal of Mechanical Design, vol. 129, No. 4, pp. 381-389, 2007.

Leland, E., et al., "Resonance Tuning of Piezoelectric Vibration Energy Scavenging Generators Using Compressive Axial Preload," Smart Materials and Structures, vol. 15, No. 5, pp. 1413-1420, 2006.

Ma, K. W., et al., "An Integrated Flyback Converter for DC Uninterruptible Power Supply," IEEE Transactions on Power Electronics, vol. 11, No. 2, pp. 318-327, Mar 1996.

Madden, J., et al., "Artificial Muscle Technology: Physical Principles and Naval Prospects," Journal of Oceanic Engineering, vol. 29, No. 3, pp. 706-728, 2004.

Newnham, R. E., et al., "Flextensional 'Moonie' Actuators," in 1993 IEEE Proceedings, Ultrasonics Symposium, vol. 1, pp. 509-513, 1993.

Niezrecki, C., et al., "Piezoelectric Actuation: State of the Art," The Shock and Vibration Digest, vol. 33, No. 4, pp. 269-280, 2001.

Otero, T., et al., "Polypyrrole: Diffusion Coefficients and Degradation by Overoxidation," Journal of Physical Chemistry B, vol. 108, No. 39, pp. 15429-15433, 2004.

Pelrine, R., et al. "Dielectric Elastomer Artificial Muscle Actuators: Toward Biomimetic Motion," in Prodeings of the SPIE, vol. 4695, pp. 126-137, 2002.

Pelrine, R., et al., "Electrostriction of Polymer Dielectrics with Compliant Electrodes as a Means of Actuation," Sensors & Actuators, A, vol. 64, No. 1, pp. 77-85, 1998.

Pelrine, R., et al., "High-Speed Electrically Actuated Elastomers with Strain Greater Than 100%," Science, vol. 287, No. 5454, pp. 836-839, 2000.

Plante, J-S, et al., "On the Properties of Dielectric Elastomer Actuators and Their Design Implications," Smart Materials and Structures, vol. 16, No. 2, pp. S227-S236, 2007.

Pobering, S., et al., "A Novel Hydropower Harvesting Device," Proceedings of IEEE International Conference on MEMS, NANO, and Smart Systems, pp. 480-485, 2004.

Priya, S., "Advances in Energy Harvesting Using Low Profile Piezoelectric Transducers," Journal of Electroceramics, vol. 19, No. 1, pp. 165-182, 2007.

Ray, B., "Bidirectional DC/DC Power Conversion Using Quasi-Resonant Topology," IEEE Power Electronics Specialists Conference, 1992. PESC '92 Record, pp. 617-624, 1992.

Shih, W., et al., "Scaling Analysis for the Axial Displacement and Pressure of Flextensional Transducers," Journal of the American Ceramic Society, vol. 80, No. 5, 1073-1078, 1997.

Sodano, H., et al., "A Review of Power Harvesting from Vibration using Piezoelectric Materials," Shock and Vibration Digest, vol. 36, No. 3, pp. 197-205, 2004.

Techet, A., et al., "Piezoelectric Eels for Energy Harvesting in the Ocean," Proceedings—International Offshore and Polar Engineering Conference, vol. 12, pp. 713-718, 2002.

Ueda, J., et al., "Static Lumped Parameter Model for Nested PZT Cellular Actuators with Exponential Strain Amplification Mechanisms," in Proceedings of the IEEE International Conference on Robotics and Automation, 2008, ICRA 2008, pp. 3582-3587, 2008.

Van Der Linde, R., "Active Leg Compliance for Passive Walking," In Proceedings of the IEEE International Conference on Robotics and Automation, Leuven, Belgium, pp. 2339-2344, 1998.

Veneman, J. F., et al., "A Series Elastic- and Bowden-Cable-Based Actuation System for Use as Torque Actuator in Exoskeleton-Type Robots," International Journal of Robotics Research, vol. 25, No. 3, pp. 261-281, 2006.

Volpe, B.T., et al., "A Novel Approach to Stroke Rehabilitation: Robot-Aided Sensorimotor Stimulation," Neurology, vol. 54, No. 10, pp. 1938-1944, 2000.

Wu, W., et al., "Tunable Resonant Frequency Power Harvesting Devices," Proceedings of the SPIE, vol. 6169, pp. 61690A-1-61690A-8, 2006.

Yan, J., et al., "Towards Flapping Wing Control for a Micromechanical Flying Insect," Proceedings—IEEE International Conference on Robotics and Automation, vol. 4, pp. 3901-3908, 2001.

Zhou, H., et al., "Analysis of a Diamond-Shaped Mechanical Amplifier for a Piezo Actuator," International Journal of Advanced Manufacturing Technology, vol. 32, pp. 1-7, 2007.

International Search Report, International Application No. PCT/US2010/055965, dated Jul. 29, 2011, issued by International Searching Authority, Korean International Property Office.

\* cited by examiner

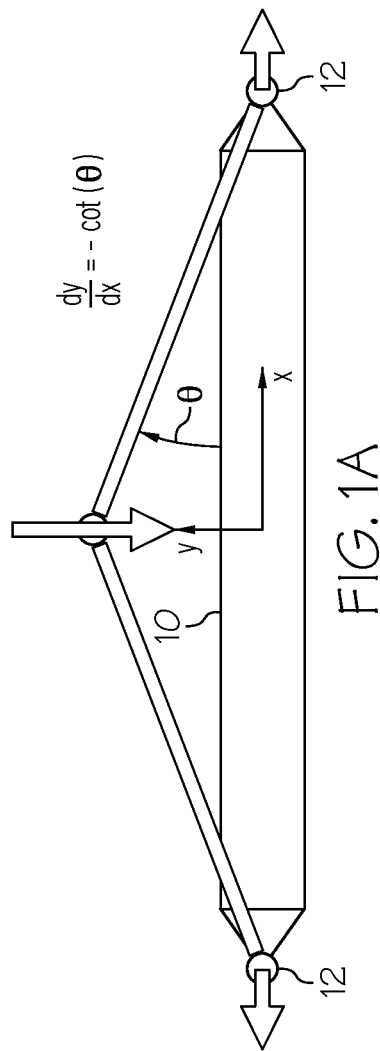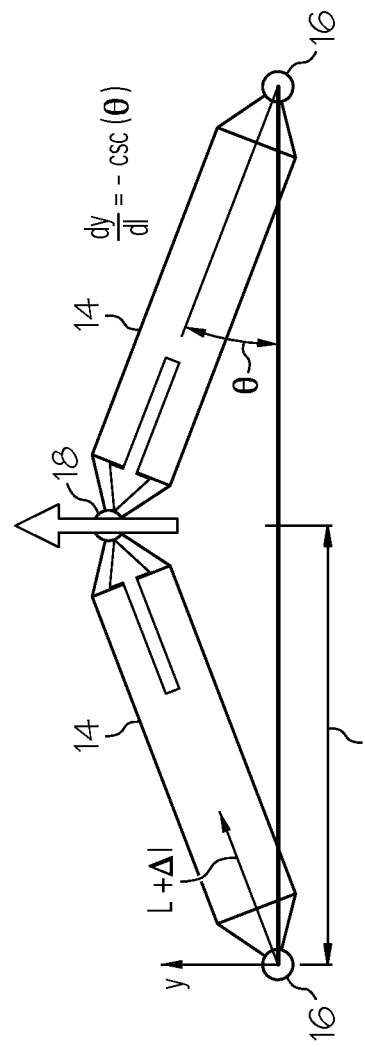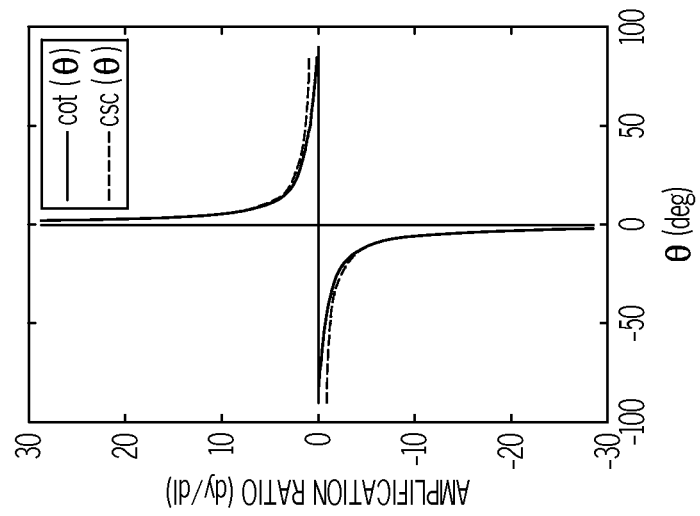
FIG.1A
FIG.1B
FIG.1C

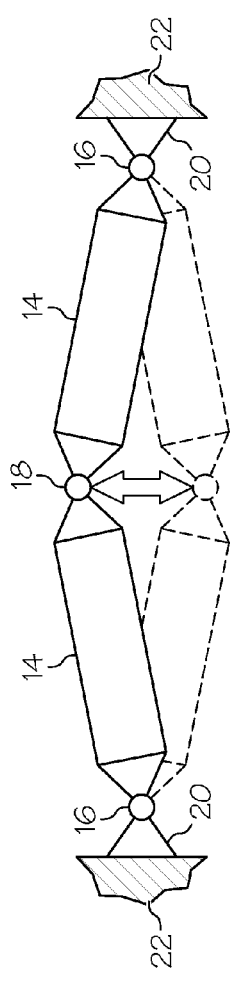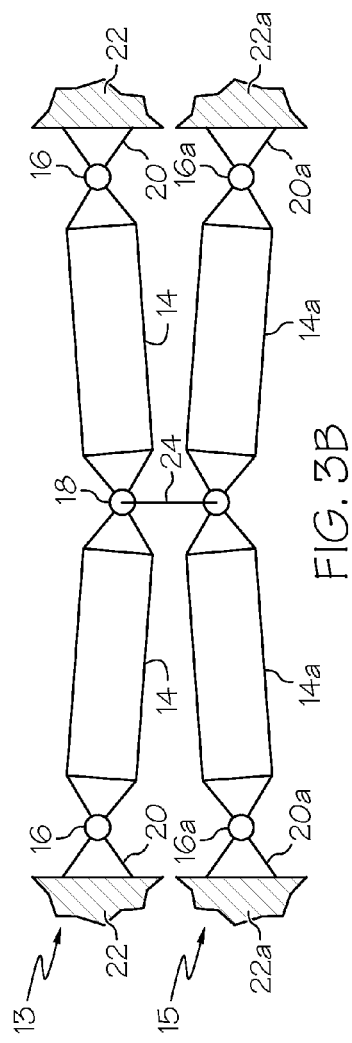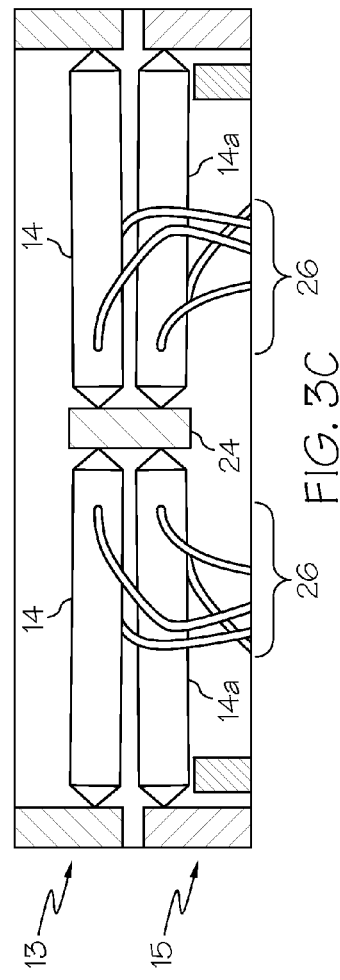

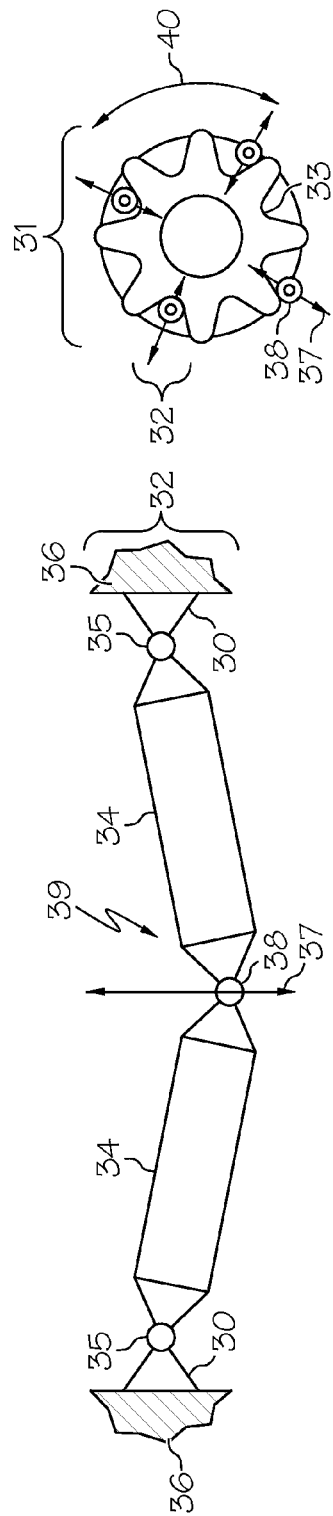
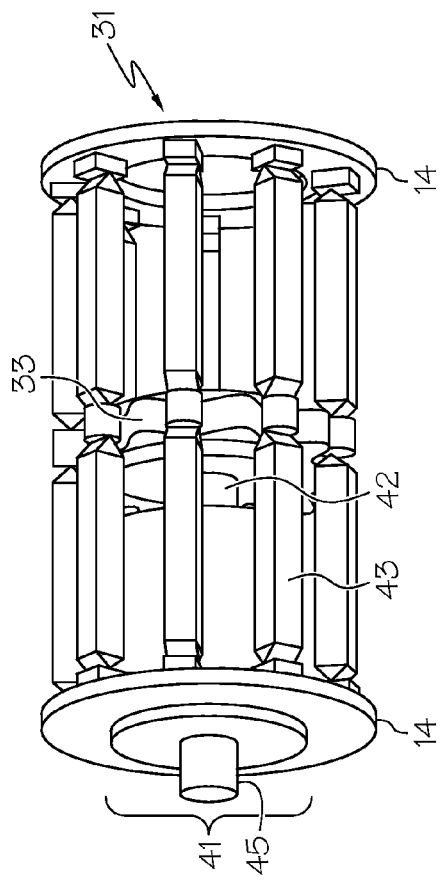
FIG. 4A(1)
FIG. 4A(2)
FIG. 4B

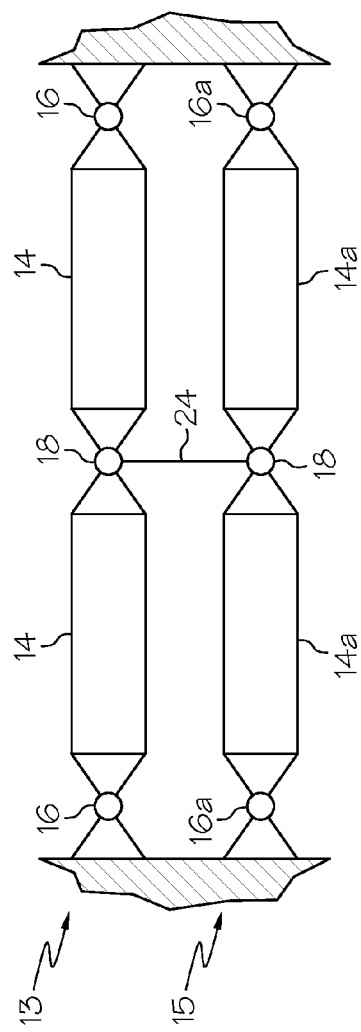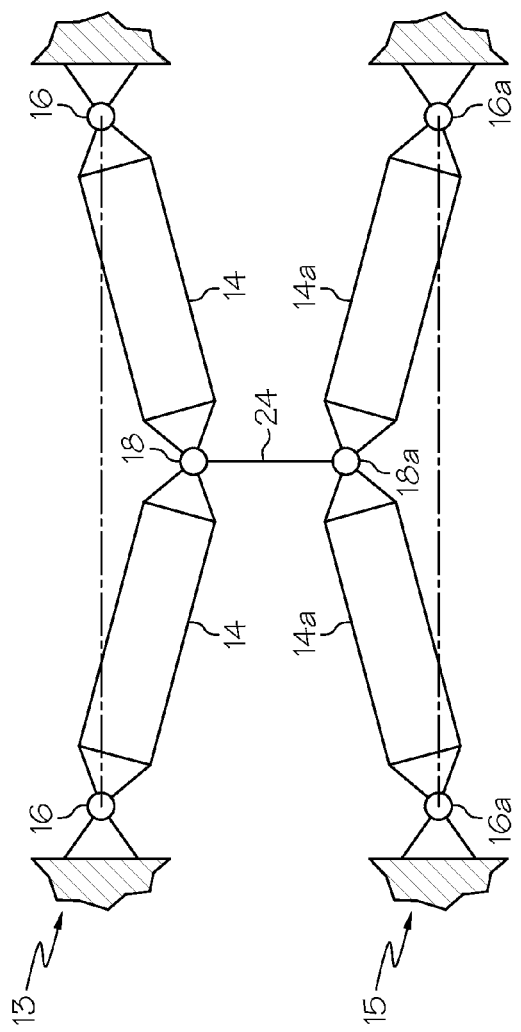

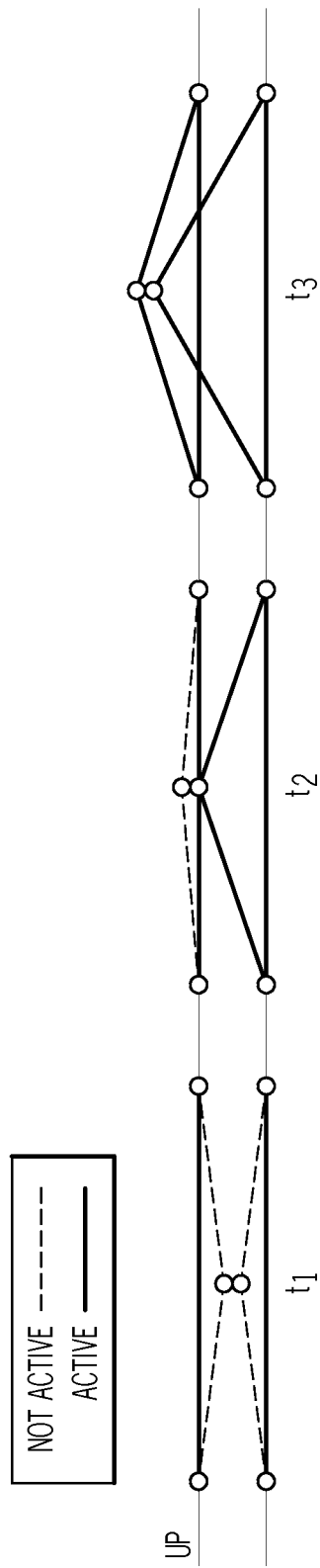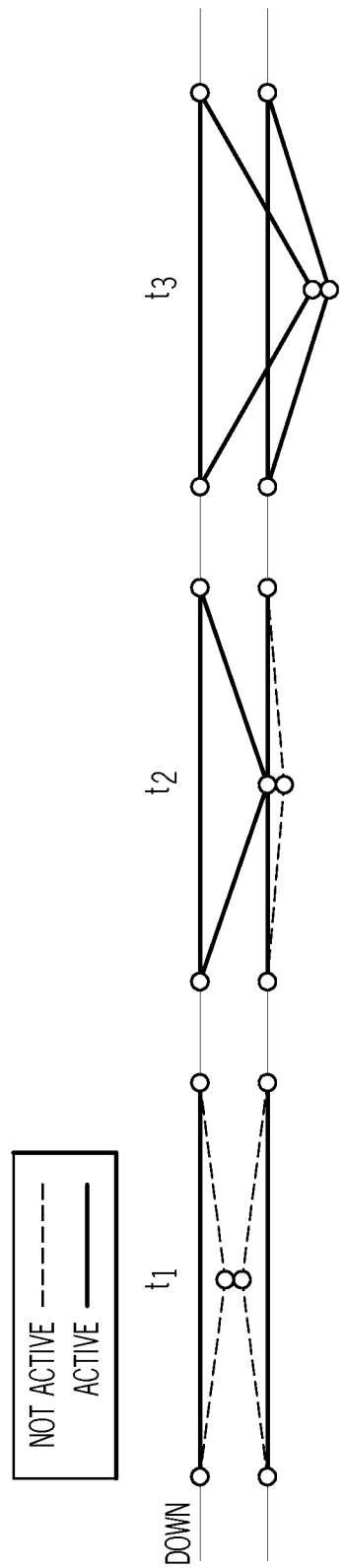
FIG. 10A
FIG. 10B

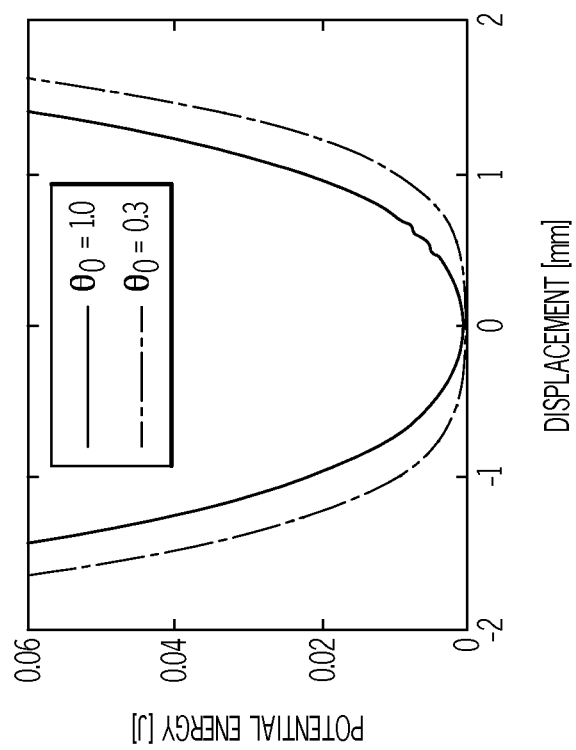
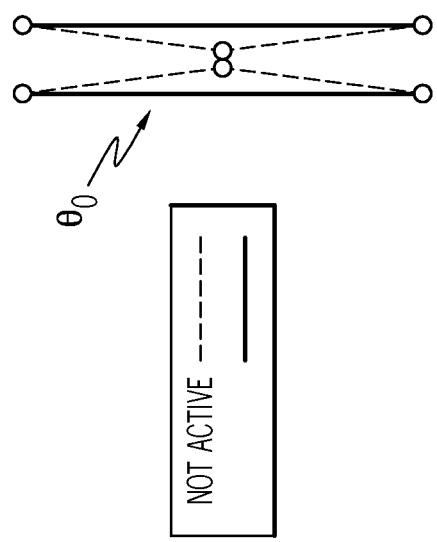
FIG. 11A

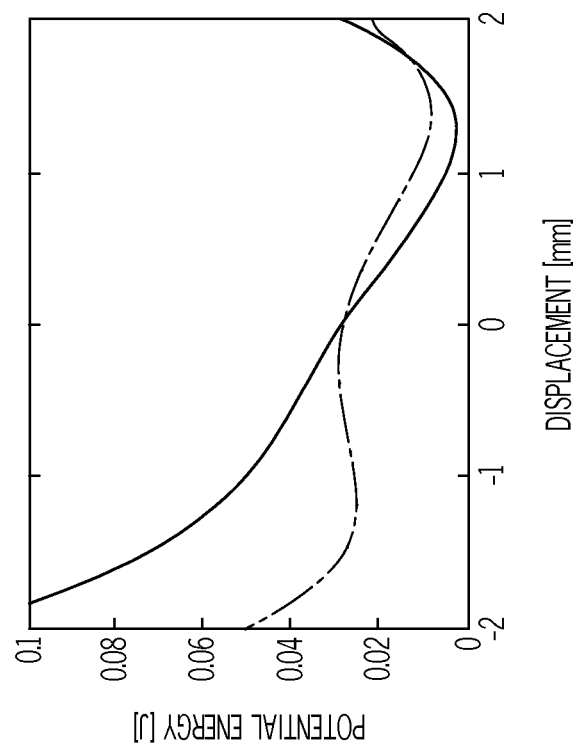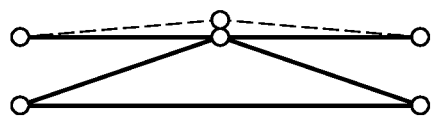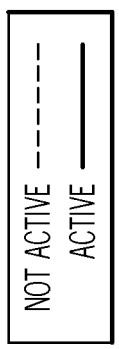
FIG. 11B

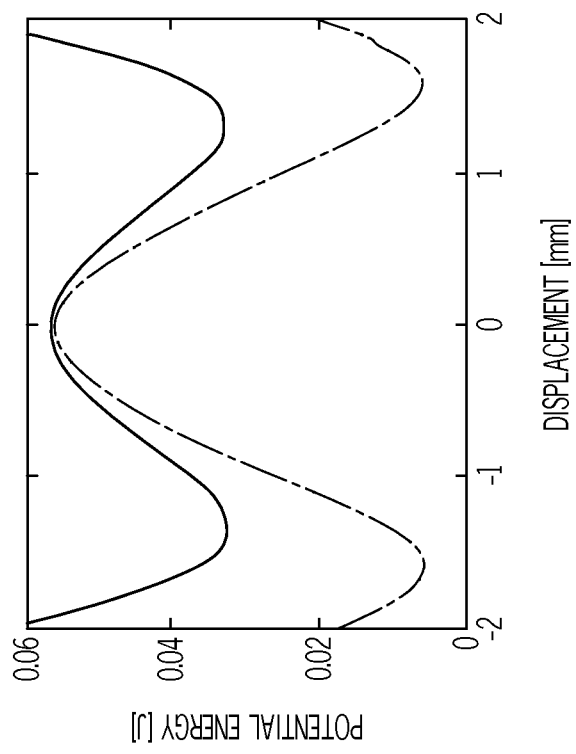
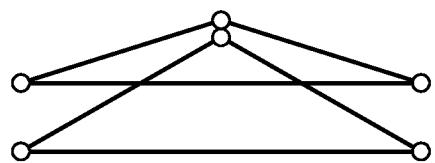
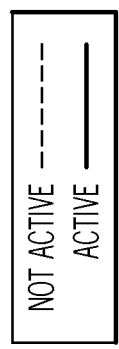
FIG. 11C

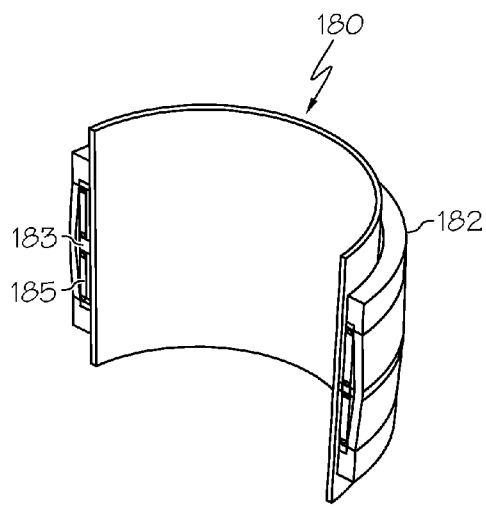# 
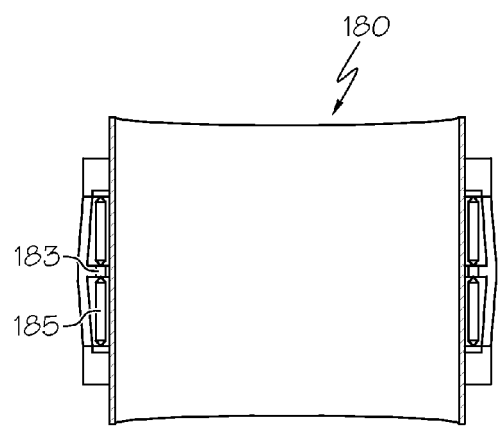
FIG. 19A
FIG. 19B
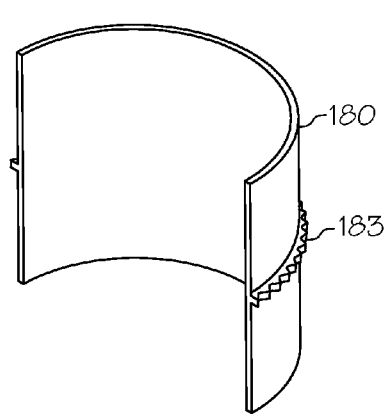
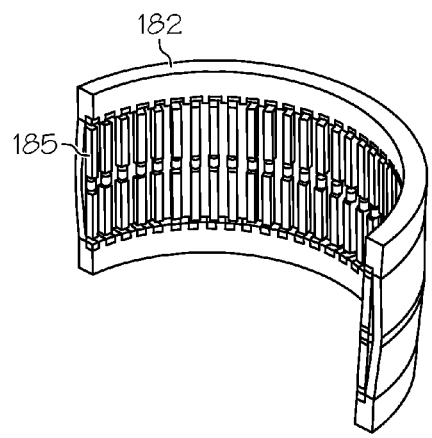
FIG. 19C
FIG. 19D

PHASED ARRAY BUCKLING ACTUATOR

RELATED APPLICATIONS

This application claims the benefit of U.S. Provisional Patent Application No. 61/259,873, filed Nov. 10, 2009, the content of which is incorporated herein by reference in its entirety.

FIELD OF THE INVENTION

The present invention relates in general to electromechanical actuators and in particular to piezoelectric displacement amplification mechanisms.

BACKGROUND OF THE INVENTION

Piezoelectric actuators possess some of the most promising attributes of all developed mechanical actuators. They are capable of operating at frequencies in the MHz range, and with their significant actuation stress, have a maximum power density (W m$^{-3}$) comparable to hydraulic actuators. Their efficiency ranges from 0.90 to 0.99, well above every other actuator material. The most significant drawback of piezoelectric actuators, however, is the displacement/strain they are capable of producing. With a typical actuation strain of about 0.1%, high strain piezoelectric actuators such as Lead Zirconate Titanate (PZT) stacked to a length of 20 mm will have an unforced displacement of just 20 μm.

Such displacements are largely impractical for broad scale applications, such as robotic systems. Significant research has gone into amplifying the strain that piezoelectric actuators can produce. Means for amplifying the strain produced by piezoelectric actuators include bi-morph and uni-morph bending beam actuators, frequency leveraged "inchworm" actuators, and flextensional strain amplification mechanisms. A conventional flextensional actuator utilizes a rhombus or ellipse-shaped mechanism in which the piezoelectric actuator actively forces the two corners of a major axis causing displacement along a minor axis. Except for the inchworming, or repetitive motion mechanisms, these strain amplification techniques can produce rather limited displacements. Unless multi-stage amplification is used, the output displacement is typically less than 1 mm, which is too short for most robotics applications.

A nonlinearity of structural mechanics, buckling, and singular phenomenon can produce an order-of-magnitude larger effective strain amplification in a single stage. The nonlinearities arising in mechanisms and structural mechanics have typically been thought of as parasitic properties. Strain amplification mechanisms have been designed to keep the output as an approximately linear function of input actuator force and displacement.

In a conventional mechanism, an actuator is a component that produces mechanical work simply by moving a load. The conventional mechanism is merely a uni-directional energy transducer. The conventional mechanisms do not utilize power re-generation and energy harvesting, for example, which are reverse processes transducing mechanical energy back to electric energy. Traditional gear reducers, although optimally tuned to the load, are not necessarily effective for power re-generation and energy harvesting. Impedance matching must be defined differently between forward and backward power transmission. Friction at the gearing and transmission mechanisms often consumes a substantial fraction of available power. The actuator may not be backdriveable.

Backdriveability is an important requirement particularly for a class of machines that physically interact with humans. These include rehabilitation training machines, mobility aids, and power suits. Many of these are creating a growing industry due to demographic changes in modern industrialized countries. Actuators must not only move a human, but also comply with the human and guide the human safely and effectively. The actuators must be bi-directional and interactive to meet these needs.

SUMMARY OF INVENTION

In accordance with an aspect of the invention, a displacement amplification device includes a plurality of buckling actuator units, wherein asynchronous activation of the plurality of buckling actuator units controls displacement direction. Each of the buckling actuator units includes first and second input linear actuators, a first rotational joint rigidly coupling one end of the first input linear actuator to a common ground, a second rotational joint rigidly coupling one end of the second input linear actuator to the common ground and a third rotational joint coupling the other end of each of the first and second input linear actuators to each other. The third rotational joint is coupled and arranged such that the third rotational joint displaces in either direction across a line defined by the first and second rotational joints with zero displacement being defined by the third rotational joint lying on the line defined by the first and second rotational joints. The third rotational joints of first and second buckling actuator units of the plurality of buckling actuators units are free to move in the same plane and are mechanically coupled to each other.

In an embodiment, activating the first buckling actuator unit of the plurality of buckling actuator units forces the second buckling actuator unit of the plurality of buckling actuator units from one side to the other of the zero displacement point of the second buckling actuator unit.

In an embodiment, the first and second buckling actuator units are spatially out of phase.

In an embodiment, the first and second input linear actuators of the first and second buckling actuator units are at a non-zero angle to the line defined by the first and second rotational joints of the first and second buckling actuator units, respectively, in an inactive state.

In an embodiment, the third rotational joints of the first and second buckling actuator units are both inside or both outside the lines defined by the first and second rotational joints of the first and second buckling actuator units.

In an embodiment, the lines defined by the first and second rotational joints of the first and second buckling actuator units are in parallel.

In an embodiment, output displacement axes of each of the first and second buckling actuator units are collinear.

In an embodiment, the first and second buckling actuator units are substantially identical.

In an embodiment, an inactive, unforced minimum distance between the third rotational joint and the line defined by the first and second rotational joints in each of the first and second buckling actuator units are equal.

In an embodiment, the first and second input linear actuators are piezoelectric actuators.

In accordance with another aspect of the invention, a displacement amplification device includes a plurality of buckling actuator units, wherein asynchronous activation of the plurality of buckling actuator units controls displacement direction. Each of the buckling actuator units includes first and second input linear actuators, a first rotational joint rigidly coupling one end of the first input linear actuator to a common ground, a second rotational joint rigidly coupling one end of the second input linear actuator to the common ground and a third rotational joint coupling the other end of each of the first and second input linear actuators to each other. The third rotational joint is coupled and arranged such that the third rotational joint buckles in either direction across a line defined by the first and second rotational joints. The plurality of buckling actuator units are engaged to a track and are harmonically activated to generate net force on the track.

In an embodiment, the track is gear-shaped such that the force generated by the buckling actuator units generates a torque output. In another embodiment, the gear-shaped track is coupled to a slow speed shaft of a gear reducer.

In an embodiment, a gear box of the gear reducer is rigidly coupled to the common ground shared by the individual buckling actuator units. In another embodiment, the gear reducer is encompassed by the gear-shaped track.

In an embodiment, the plurality of buckling units are equally spaced apart along the track.

In an embodiment, the first and second input linear actuators are piezoelectric actuators.

In accordance with another aspect of the invention, a method of controlling a displacement direction of a displacement amplification device includes providing a plurality of buckling actuator units, activating a first buckling actuator unit of the plurality of buckling actuator units such that a second buckling actuator unit of the plurality of buckling actuator units is forced from one side to the other of a zero displacement point of the second buckling actuator unit and activating the second buckling actuator unit such that the magnitude of displacement of the first and second buckling actuator units is increased.

In one embodiment, each of the plurality of buckling actuator units includes first and second input linear actuators, a first rotational joint rigidly coupling one end of the first input linear actuator to a common ground, a second rotational joint rigidly coupling one end of the second input linear actuator to the common ground, and a third rotational joint coupling the other end of each of the first and second input linear actuators to each other. In another embodiment, the third rotational joints of the first and second buckling actuators are free to move in the same plane and are mechanically coupled to each other. In another embodiment, when the first and second buckling actuator units are inactive, the first and second input linear actuators of the first and second buckling actuator units are at an angle to a line defined by the first and second rotational joints of the first and second buckling actuator units, respectively.

In accordance with another aspect of the invention, a displacement amplification device includes a first buckling actuator unit tending to cause displacement of the first buckling actuator unit in a first direction when activated, and a second buckling actuator unit tending to cause displacement of the second buckling actuator unit in a second direction when activated. Asynchronous activation of the first and second buckling actuator units controls buckling direction and wherein one of the first and second buckling actuator units is forced beyond a zero displacement point by the other of the first and second buckling actuator units.

In one embodiment, the first and second buckling actuator units each include first and second input linear actuators, a first rotational joint rigidly coupling one end of the first input linear actuator to a common ground, a second rotational joint rigidly coupling one end of the second input linear actuator to the common ground, and a third rotational joint coupling the other end of each of the first and second input linear actuators to each other.

In another embodiment, the first and second input linear actuators are piezoelectric actuators.

BRIEF DESCRIPTION OF THE DRAWINGS

The foregoing and other objects, features and advantages of embodiments of the present inventive concepts will be apparent from the more particular description of exemplary embodiments, as illustrated in the accompanying drawings in which like reference characters refer to the same elements throughout the different views. The drawings are not necessarily to scale, emphasis instead being placed upon illustrating the principles of the exemplary embodiments.

FIG. 1A is a schematic view of an actuator stack arrangement. FIG. 1B is a schematic view of a buckling piezoelectric actuator unit, in accordance with an exemplary embodiment of the present inventive concept. FIG. 1C is a graph illustrating amplification ratios of FIGS. 1A and 1B.

FIG. 3A is a schematic view of a single pair buckling actuator, according to an exemplary embodiment of the present inventive concept. FIG. 3B is a schematic view of a dual buckling actuator, according to an exemplary embodiment of the present inventive concept. FIG. 3C is a prototype dual buckling actuator, according to an exemplary embodiment of the present inventive concept.

FIG. 4A(1) includes a schematic side view of a buckling actuator unit of a harmonic buckling actuator, and FIG. 4A(2) includes a schematic cross-sectional view of a harmonic buckling actuator, according to an exemplary embodiment of the present inventive concept. FIG. 4B is a perspective view of a harmonic bulking actuator, according to an exemplary embodiment of the present inventive concept.

FIG. 9A illustrates a schematic view of a dual buckling actuator spatially in phase, according to an exemplary embodiment of the present inventive concept. FIG. 9B illustrates a schematic view of a dual buckling actuator spatially out of phase, according to an exemplary embodiment of the present inventive concept.

FIG. 10A illustrates an asynchronous activation time sequence of a dual-unit phase shifted buckling actuator showing upward free displacement, and FIG. 10B illustrates an asynchronous activation time sequence of a dual-unit phase shifted buckling actuator showing downward free displacement, in accordance with an exemplary embodiment of the present inventive concept.

FIG. 11A is a graph of potential energy versus displacement of a dual-unit out-of-phase actuator when both buckling actuator units are inactive, in accordance with an exemplary embodiment of the present inventive concept. FIG. 11B is a graph of potential energy versus displacement of a dual-unit out-of-phase actuator when a left buckling actuator unit is active, in accordance with an exemplary embodiment of the present inventive concept. FIG. 11C is a graph of potential energy versus displacement of a dual-unit out-of-phase actuator when both buckling actuator units are active, in accordance with an exemplary embodiment of the present inventive concept.

FIGS. 19A and 19B are cross-sectional, perspective views of the high power-density PZT harmonic actuator, in accordance with an exemplary embodiment of the present inventive concept. FIG. 19C is a cross-sectional, perspective view of an inner hollow gear shaft of the high power-density PZT harmonic actuator of FIGS. 19A and 19B. FIG. 19D is a cross-sectional, perspective view of an outer casing with imbedded PZT buckling actuator units of the high power-density PZT harmonic actuator of FIGS. 19A and 19B.

DETAILED DESCRIPTION OF EMBODIMENTS

Figure 2A:
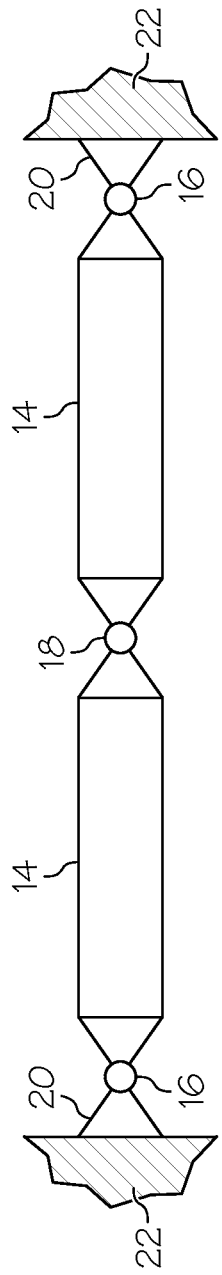
FIGS. 2A and 2B are schematic views of a nonlinear, large-strain buckling piezoelectric actuator unit, in accordance with an exemplary embodiment of the present inventive concept.

Various exemplary embodiments will be described more fully hereinafter with reference to the accompanying drawings, in which some exemplary embodiments are shown. The present inventive concepts may, however, be embodied in many different forms and should not be construed as limited to the exemplary embodiments set forth herein.

It will be understood that when an element is referred to as being "on," "connected to" or "coupled to" another element, it can be directly on, connected or coupled to the other element or intervening elements may be present. In contrast, when an element is referred to as being "directly on," "directly connected to" or "directly coupled to" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

The terminology used herein is for the purpose of describing particular exemplary embodiments only and is not intended to be limiting of the present inventive concept. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, the inventive concepts will be described in detail by explaining exemplary embodiments of the inventive concepts with reference to the attached drawings. Like reference numerals in the drawings denote like elements.

Piezoelectric actuators, such as PZT stacks, possess high stress, high bandwidth, and high power density (Watts/m$^3$) along with compact, reliable and stable material properties. Among many non-electromagnetic actuator materials, piezoelectric materials satisfy all critical requirements for practically useful actuators, except for their extremely small strain. Other actuators, including shape memory alloy, conducting polymers, and dielectric elastomers, have critical drawbacks that significantly limit usefulness and applicability. Dielectric elastomers, for example, do not last for a long time, need a very high voltage (over 6,000 volts), but have small energy density. Also, conducting polymers degrade quickly and need a reservoir to submerge polymers in electrolyte. The main drawback of piezoelectric actuators, namely, only 0.1% strain, may be solved with a flexure device. These flexures may effectively change the strain-stress ratio on the order of 100. This means that the effective strain becomes more than 10%, comparative to skeletal muscles. The effective stress, in contrast, remains strong, over 100 MPa. This well-balanced performance allows the use of the piezoelectric actuator for many practical applications. Furthermore, its unique properties open up new possibilities and create new functionality.

To overcome the drawbacks of the piezoelectric actuators, namely, an extremely small strain, an exemplary embodiment of the present inventive concept includes an effective flexure device which amplifies displacement on the order of 100 times, specifically, a buckling type flexure device.

The buckling type flexure device may amplify the PZT stack displacement more than 100 times in a single-stage, compact monolithic body. In one embodiment of the present inventive concept, the buckling type flexure device has a unique force-displacement nonlinearity and small form factor which allow the multitude of piezoelectric buckling actuators to be imbedded in a compact housing, creating a high torque, compact rotary actuator with a number of unique features. Specifically, the buckling type flexure device may be used in a harmonic buckling actuator, as described hereinafter. The harmonic buckling actuator is backdriveable, has zero backlash, and has high power and high torque with over 160 Nm of maximum torque and 5.6 kW output power. The harmonic buckling actuator has a hollow shaft or is of a compact ring-type. The harmonic buckling actuator may be applied to effective charge recovery and energy harvesting techniques by exploiting its low friction, backdriveable properties along with the capacitive nature of the transducer.

The harmonic buckling actuator has a number of promising application areas. For example, power suits and wearable rehabilitation equipment may utilize the harmonic buckling actuator. Small construction machines, forklifts, and other mobile robots may utilize the actuator technology particularly when energy efficiency is critically important.

Bi-Directional, Interactive Actuation

Conventional electromechanical actuators include bulky gear reducers to match load impedance. These conventional electromechanical actuators with gearing may be used to move a load. However, these conventional electromechanical actuators do not have diverse functionalities. For construction machines with electric motors, power re-generation is a critical requirement for power efficiency. However, gear reducers cause adverse effects on power re-generation and energy harvesting because of significant loss due to friction when back driving them. Conventional actuator and transmission designs follow the traditional paradigm of one-way power transmission from an actuator to the load. Power re-generation and energy harvesting are backward power transmissions, which cannot be optimized if the actuator-reducer system has been optimized only for the forward power transmission. Bi-directional, interactive actuator-load matching is considered in an exemplary embodiment of the present invention.

Soft Actuators and their Application to Rehabilitation Training

All mechatronic, robotic, and vehicle systems interact with the environment posing as a load. For example, a rehabilitation training machine for stroke patients guides the patient's arm by constraining the arm with an appropriate stiffness while prompting or pushing the patient's arm in a given direction. The training machine must not simply push the patient's arm, but has to comply with the patient's motion to a certain degree. This requires the actuator system to be backdriveable and adjustable with respect to stiffness. Conventional electromechanical actuators with high gear reduction cannot meet these requirements due to friction. Rehabilitation studies have revealed that stiffness must be adjusted to each patient in order to maximize training efficiency. Bi-directional, interactive actuators with variable stiffness capability are required for rehabilitation machines.

Power Efficiency and Charge Recovery

Piezoelectric transducers are in general capacitive. They are fundamentally different from electromagnetic transducers, which are inductive. Generating torque with an electromagnetic transducer entails a current through windings, which inevitably consumes power, $P=Ri^2$. In contrast, no power is consumed for maintaining a constant force in piezoelectric transducers. As long as a constant charge is retained in the piezoelectric capacitance, no current is needed and, therefore, no power is consumed. Piezoelectric actuators are power efficient in general, but they are particularly efficient for bearing a constant load for a long time. Because of the fundamental difference in principle, it is difficult to make a simple comparison of efficiency between electromagnetic and piezoelectric transducers. Nonetheless, piezoelectric transducers have the potential to be even more power efficient if the capacitive nature of the transducer is exploited.

The charge stored in a PZT stack can be recovered with a specialized circuit. Instead of discharging it to ground, the charge stored in a piezoelectric transducer can be moved to another capacitive storage component, or can be sent back to a battery. If a commanded reference is cyclic, all that is necessary is to move a charge back and forth between a PZT stack and a storage capacitor. Battery power is consumed only for compensating for the loss due to some parasitic resistance at the wire and the switching circuit involved.

Resonance: Exploiting Dynamics

PZT stack actuators with built-in flexures form a mass-spring system that vibrates. When vibrating at a resonant frequency, the actuator's output displacement becomes significantly larger than its static amplitude. It is known that animal gaits utilize resonance, and biologically inspired robots exploit this type of resonant dynamics for power-efficient locomotion. These inherent dynamics of the PZT stack actuators of an embodiment of the present inventive concept are useful not only for legged robots, but also for a broad class of machines, where actuators have to generate a cyclic, repetitive motion at a certain frequency. Another salient feature of the cellular piezoelectric actuators is that the resonant frequency can be varied in a wide range. This allows the actuator to be driven with matched dynamics tuned to the task and the environment. Depending on the frequency of cyclic motion, the actuator system can accommodate its resonant frequencies and tailor its dynamic profile so that desired motion can be generated with minimum power consumption or maximum power transmission. This unique feature of variable resonance and tunable dynamics may be extended further to a more powerful and general methodology, and applied to practical tasks.

Energy Harvesting

For more advanced applications energy harvesting is an important issue. For example, in a deep water robot for long-mission natural resource exploration, since on-board battery power is limited, frequent recharging of the battery is required, which disrupts an exploration task, if the robot must return to a charging station. Instead, if the robot can harvest energy from currents at the sea bed, it can perform a long-term mission without returning to a charging station.

The piezoelectric actuators of an embodiment of the present inventive concept are an effective solution to the long-term mission capability through energy harvesting. The same piezoelectric transducers can be used as actuators and generators for both forward motion generation and backward energy harvesting. Unlike traditional electromagnetic actuators with large gear reducers, the piezoelectric actuators are completely backdriveable with minimum loss due to low friction. The bi-directional embodiment makes the system effective in both actuation and generation. Furthermore, the tunable resonant frequency greatly enhances the energy harvesting efficiency. The energy harvesting capability of the piezoelectric transducer is optimized when the transducer resonates with the load, oscillating at a resonant frequency. With the tunable dynamics capability, the piezoelectric actuators may be operated under an optimal condition for energy harvesting by adaptively accommodating their resonant frequencies.

Fundamentals of PZT Stack Actuators

Theoretical Limits

In a PZT stack having many layers of PZT thin films and electrodes, A is the cross-sectional area of the stack and l is the length. The maximum stress under no load is denoted $\sigma$ and the strain under no stress is denoted by $\in$. Assuming a linear relationship between strain and stress, the work done by the actuator to a load with a matched stiffness in moving it from an unactivated state to an activated state is given by $$\text{Work} = \frac{1}{4} A \sigma_{max} \ell \varepsilon_{max}$$

If this work is repeated at a frequency ω Hz, the power delivered to the load is $$P_{max} = \frac{1}{4} A \ell \sigma_{max} \varepsilon_{max} \omega$$

Standard PZT stacks have $\varepsilon_{max}$=0.1% and $\sigma_{max}$=100 MPa. While the theoretical limit of bandwidth is on the order of 10 kHz, usable range of PZT stack actuators for mid-to-light duty applications is 1 kHz (ω=1 kHz). Therefore, the power density per unit volume is $$P_{density} = \frac{1}{4} 100 \times 10^6 \times 0.1 \times 10^{-2} \times 1 \times 10^3 = 25 \times 10^6 \text{ J/sm}$$

If a PZT stack of A=50 mm×50 mm=2.5×10$^{-3}$ m$^2$ and l=10 cm=10$^{-1}$ m is used, then the maximum power is $P_{max}$=6.25 kW. This outperforms all actuator materials, including electromagnetic actuators, conducting polymers, dielectric elastomers, and shape memory alloys as well as skeletal muscles.

The maximum free displacement of the PZT stack, l=10 cm=10$^{-1}$ m, is merely 0.1 mm. Although a large force can be generated, namely, 250 kN, the usefulness of the actuator is limited with such a small displacement. The force-displacement ratio must be changed on the order of 100 or more to obtain a usable output displacement. Strain amplification is therefore an important issue. This, however, significantly reduces both effective stress and bandwidth, if it is not properly designed. FIG. 1A illustrates strain amplification kinematics inside a stack arrangement, FIG. 1B illustrates strain amplification kinematics outside a stack arrangement and FIG. 1C illustrates an amplification ratio for strain amplification kinematics inside and outside a stack arrangement.

Strain Amplification Mechanisms

FIG. 1A illustrates a mechanism used for many commercial products. FIG. 1A shows only the upper half of the mechanism; adding the lower half gives the entire structure a rhombus-like shape. The stack arrangement of FIG. 1A includes a PZT stack 10 and rotational joints 12. A PZT stack 10 is placed on the horizontal edge of the triangle, while the top two edges connected with a free joint are rigid links. If the angle θ between the PZT stack 10 and one of the edges is small, the displacement in the vertical direction is much larger than the displacement created by the PZT stack 10 in the horizontal direction. FIG. 1C illustrates the amplification ratio from input x to output y: dy/dx=−cot(θ). As angle θ B gets smaller, the amplification gain increases. Considering many practical conditions and design trade-offs, an amplification gain of approximately 5~10 may be obtained with the embodiment of FIG. 1A. As discussed above, a gain of 100 is needed in order to use the mechanism as an actuator that may be used for broad applications. To accomplish this, a buckling flexure method is used.

FIG. 1B illustrates a schematic view of a buckling piezoelectric actuator unit. The buckling piezoelectric actuator unit of FIG. 1B includes a pair of piezoelectric stacks 14, a keystone output node 18 and rotational joints 16.

Figure 2B:
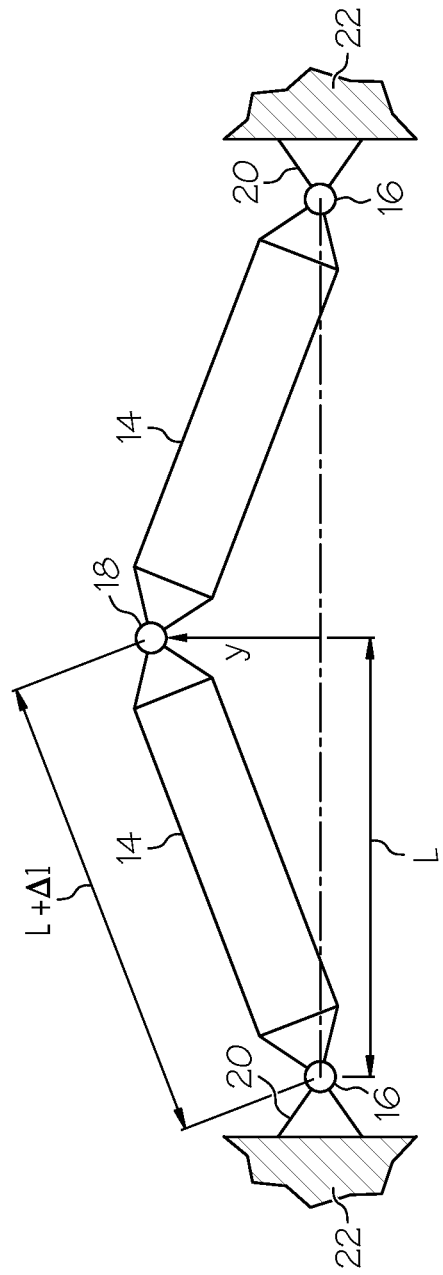

FIGS. 2A and 2B are schematic views of a nonlinear, large-strain buckling piezoelectric actuator unit, including a pair of piezoelectric stacks 14 and a monolithic structure 22. The monolithic structure 22 mechanically grounds the piezoelectric stacks 14 between a keystone output node 18 and end supports 20 placed at both sides. The end supports 20 and keystone output node 18 are connected to the piezoelectric stacks 14 through rotational joints 16.

Another method for obtaining a large amplification gain on the order of 100 is to utilize kinematic nonlinearity. As illustrated in FIG. 1C, the amplification gain becomes infinite as the angle θ approaches zero, namely, a singularity point. FIG. 1B is a schematic view of a strain amplification flexure that utilizes the kinematic singularity at θ=0. As PZT stacks 14 are activated, they tend to elongate, generating a large stress along the longitudinal direction. When the two PZT stacks 14 are completely aligned, the longitudinal forces cancel out, creating an unstable equilibrium. With any disturbance, the two PZT stacks 14 tend to buckle as illustrated in FIGS. 1B and 2B. As illustrated in FIGS. 1B and 2B, L is the rest length of each PZT stack 14, Δl is the active rest length of the PZT stack 14 or elongation of each PZT stack 14 and y is the vertical displacement of the keystone output node 18. FIG. 1C illustrates the amplification ratio from output y to output Δl: dy/dl=csc(θ). The displacement amplification ratio, $$G = \frac{\Delta y}{\Delta \ell}$$

tends to infinity as y approaches 0. Differentiating the kinematic relation, y$^2$=(L+Δl)$^2$−L$^2$, in terms of Δl and ignoring higher-order small quantities yields the following amplification ratio, G, $$G \cong \frac{L}{y} \to \infty, \text{ as } y \to 0. \tag{1}$$

This is a type of kinematic singularity. Even for a finite piezoelectric displacement, the amplification gain, G, is significantly large. Although the buckling mechanism may provide extremely large displacement amplification, buckling is in general an unpredictable, erratic phenomenon, which is difficult to control. The direction the output node 18 will move, upward or downward, is unknown. It is also not feasible to quasi-statically bring the output keystone from one side to the other across the middle point. Once it goes upwards, it tends to stay there, and vice versa. This is monopolar activation, where the stroke of the output keystone 18 is half of the total possible displacement. Therefore, it is desirable to both control the buckling direction and have the capability to pass through the singularity point to the other side once buckling has occurred. To achieve this bi-polar activation, previous methods have utilized additional mechanical stiffness elements. In an alternative approach, multiple buckling actuator units are arranged in parallel with spatial phase differences among the units. This utilizes nonlinear kinematic and static properties of buckling.

FIG. 3A illustrates a schematic view of a single pair buckling actuator, according to an exemplary embodiment of the present inventive concept. FIG. 3B illustrates a schematic view of a dual buckling actuator, according to an exemplary embodiment of the present inventive concept. FIG. 3C illustrates a prototype dual buckling actuator, according to an exemplary embodiment of the present inventive concept. FIG. 3A illustrates the displacement of the buckling actuator when the PZT stacks 14 are activated. Placing two pairs of PZT buckling actuator units 13 and 15 side by side, as illustrated in FIGS. 3B and 3C, controls the buckling direction by selectively activating a top or a bottom pair. The first buckling actuator unit 13 includes the pair of piezoelectric stacks 14, the keystone output node 18, the rotational joints 16, the monolithic structure 22 and the end supports 20. The second buckling actuator unit 15 includes a pair of piezoelectric stacks 14a, a keystone output node 18a, rotational joints 16a, a monolithic structure 22a and end supports 20a. The output nodes 18 and 18a of the first and second buckling actuator units 13 and 15, respectively, are mechanically coupled by a coupler 24. Alternatively, the buckling direction can be controlled by selectively activating the first and second PZT stacks 14, 14a within the buckling actuator unit 13, 15. Using this approach, instead of activating both PZT stacks 14, 14a of a buckling actuator unit 13, 15 at the same time, one PZT stack 14, 14a is activated followed by the other PZT stack 14, 14a being activated. The prototype illustrated in FIG. 3C, further includes wires 26 coupled to the PZT stacks 14 and 14a.

FIG. 4A is a schematic view of a buckling actuator unit of a harmonic buckling actuator and a cross-sectional view of a harmonic buckling actuator, according to an exemplary embodiment of the present inventive concept. FIG. 4B is a perspective view of a harmonic buckling actuator, according to an exemplary embodiment of the present inventive concept. As illustrated in FIGS. 4A and 4B, a harmonic buckling actuator 31 includes numerous buckling actuator units 32 engaged to a rotational track/gear 33. Each buckling actuator unit 32 includes two input translational actuators 34. One end of each input translational actuator 34 is constrained to rotate about a rotational joint 35 that is rigidly attached to a common ground 36 by end supports 30. The other end of each input translational actuator 34 is constrained to move with the other actuator of the same buckling actuator unit 32 along a single output axis 37 via another rotational joint 38 that is the output of the buckling actuator unit 32. The inactivated, unforced configuration of each buckling actuator unit 32 is such that the input actuators 34 are nearly collinear with a line segment 39 connecting the unit's grounded rotational joints 35. The line segment 39 is parallel to an output axis 40 of the track/gear 33. In an activated state, the input actuators 34 exhibit displacement along their longitudinal axis, resulting in displacement of the buckling actuator unit 32 in a direction traverse to the line segment 39. The buckling actuator units 32 are arrayed around the track/gear 33 such that their rotational joints or outputs 38 are spatially phased within the groves of the track/gear 33. Harmonic activation of the buckling units 32 generates torque on the track/gear 33 about its output axis 10. The hollow section of the track/gear 33 encompasses a gear reducer 41 such as a planetary gear box, cyclo-drive, or harmonic drive. The track/gear 33 is coupled to a slow speed shaft 42 of the gear reducer 41. Supports 44 for the buckling actuator units 32 are rigidly coupled to each other and to a gear box 43 of the gear reducer 41. A high speed shaft 45 is an output shaft of the entire harmonic buckling actuator 31.

Kinematic Model of a Single Unit

Figure 5A:
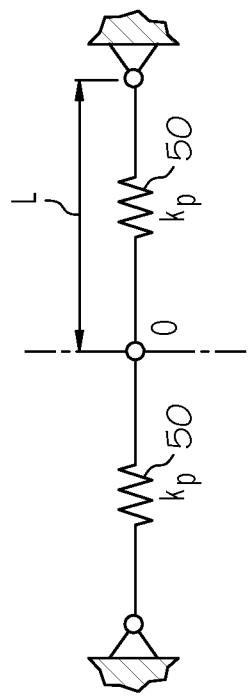
FIG. 5A is a static model of a PZT buckling mechanism at singularity point (y=0) and FIG. 5B is a static model of a PZT buckling mechanism at finite displacement (y≠0).
Figure 5B:
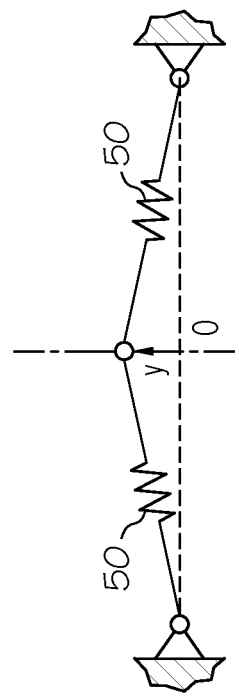

To analyze the quasi-static performance of a single buckling unit, the actuator is modeled as a system of two springs 50 as illustrated in FIGS. 5A and 5B. FIG. 5A is a static model of a PZT buckling mechanism at singularity point (y=0) and FIG. 5B is a static model of a PZT buckling mechanism at finite displacement (y≠0).

Figure 6:
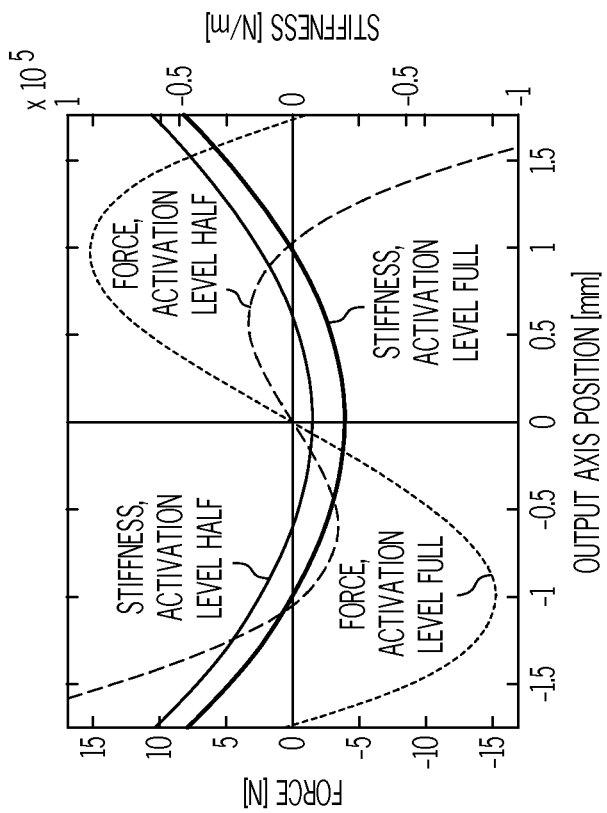
FIG. 6 is a graph of stiffness and force at full and half activation levels, according to an exemplary embodiment of the present inventive concept.

The stiffness of the springs 50 having a spring constant $k_p$ is determined by the series stiffness of the piezoelectric actuator and compressive stiffness of the joints. The inactive rest length of the springs 50 is L, and the active rest length of each spring 50 is L+Δl, where Δl is the free displacement at the given activation level. With this model, the potential energy in each spring 50 is equal to $\frac{1}{2}k_p\delta^2$, where δ is the deviation from rest length of the spring 50 as a geometric function of displacement, y, and activation free displacement, Δl. The potential energy, U, of the system of two springs 50, at various activation levels as a function of the output displacement is calculated, as shown in FIG. 6. FIG. 6 is a graph of stiffness and force at full and half activation levels, according to an exemplary embodiment of the present inventive concept. The force, F, in the output direction may be found by calculating −dU/dy, and the stiffness may be found by calculating $d^2U/dy^2$. The stiffness and force are plotted, in FIG. 6, for a prototype actuator having commercially available PZT stacks. FIG. 6 illustrates stiffness and force of the actuator output node along the output axis as a function of output node position for two activation levels, namely, one-half and full activation.

Figure 7A:
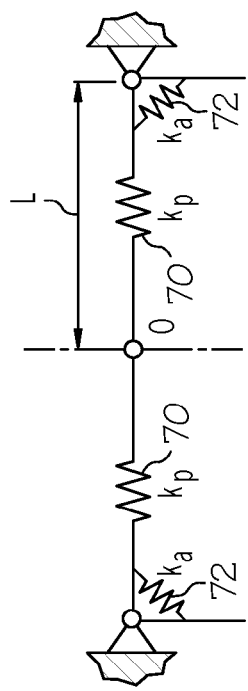
FIG. 7A is a static model of a PZT buckling mechanism at singularity point (y=0) and FIG. 7B is a static model of a PZT buckling mechanism at finite displacement (y≠0).
Figure 7B:
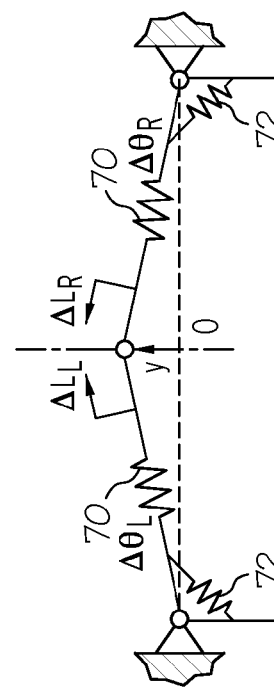

In an alternative embodiment, to analyze quasi-static characteristics of a single buckling unit, the actuator is modeled as a system of four springs 70 and 72 having spring constants $k_p$ and $k_a$, respectively, as shown in FIGS. 7A and 7B. FIG. 7A is a static model of a PZT buckling mechanism at singularity point (y=0) and FIG. 7B is a static model of a PZT buckling mechanism at finite displacement (y≠0). The two linear springs 70 with spring constant $k_p$ represent a total stiffness of the PZT stack and the flexure along the longitudinal direction of the PZT stack. The other two springs 72 with spring constant $k_a$ represent a total rotational stiffness of the flexure associated with angular displacements at both PZT stacks. The total strain energy stored in the four springs 70 and 72 is given by $$U = \frac{1}{2}k_p(\Delta L_L^2 + \Delta L_R^2) + \frac{1}{2}k_a(\Delta\theta_L^2 + \Delta\theta_R^2)$$

where linear displacements of both left and right PZT stacks, $\Delta L_L$, $\Delta L_R$, and rotational displacements of both sides, $\Delta\theta_L$, $\Delta\theta_R$, are functions of the PZT stack's activation level $u_L$ and $u_R$ and output displacement y. Therefore, the strain energy, that is potential energy U, is a function of $u_L$, $u_R$, and y: $U(u_L, u_R, y)$.

Figure 8:
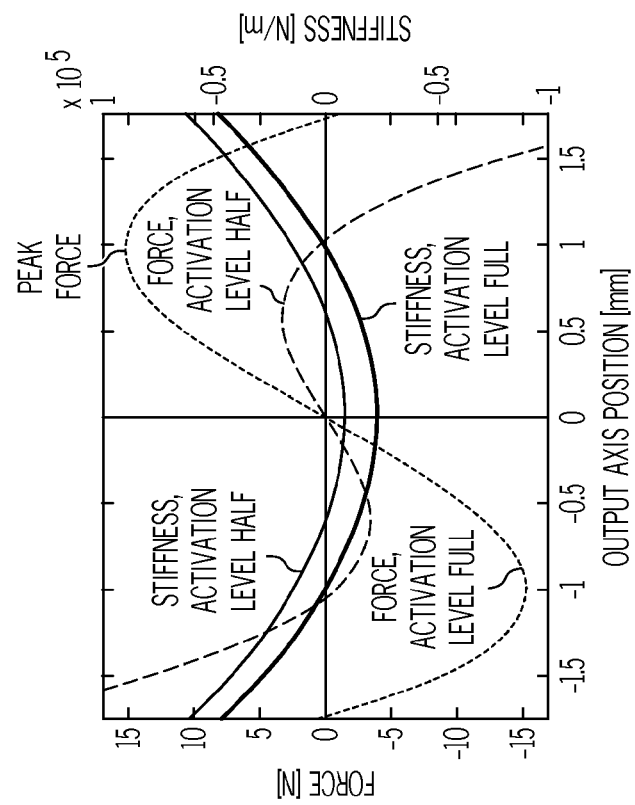
FIG. 8 is a graph of stiffness and force at full and half activation levels, according to an exemplary embodiment of the present inventive concept.

The output force in the output direction, F, may be obtained by differentiating the potential energy with respect to output y: F=−dU/dy, and the stiffness may be found by calculating the second order derivative: $d^2U/dy^2$. FIG. 8 is a graph of stiffness and force at full and half activation levels, according to an exemplary embodiment of the present inventive concept. The stiffness and force are plotted, in FIG. 8, for a small prototype actuator having commercially available PZT stacks. FIG. 8 illustrates stiffness and force of the actuator output node along the output axis as a function of output node position for two activation levels, namely, one-half and full activation.

There are a few important features to note about a single buckling actuator unit illustrated in FIGS. 6 and 8.
1) The significant displacement amplification of the actuator. The displacement in a single direction is greater than 1.5 mm at full activation, namely, 150 V. Compared to the maximum free displacement of the PZT stack (15 μm), this buckling actuator produces 100 times larger displacement.
2) Nonlinear force-displacement characteristics. The maximum force is generated not at the zero-displacement (y=0), but at a middle stroke. Also, no force is generated at the singularity point at y=0.

3) Varying stiffness. Near the singularity point, the stiffness is zero or negative, whereas it increases sharply as displacements get larger in both directions.

The second feature of non-linear force-displacement characteristics discussed above significantly differs from the inherent PZT stack properties and those with conventional strain amplification mechanisms, where the peak force, that is blocking force, is created when no displacement is made. The output force of the conventional strain amplification mechanism decreases monotonically, as displacement increases. In contrast, the buckling actuator of the exemplary embodiment of the present inventive concept produces its peak force midstroke. The nonlinear force-displacement relationship is useful.

Furthermore, the buckling actuator exhibits a unique stiffness characteristic; stiffness becomes zero or even negative with a non-zero activation level, in the vicinity of the singularity point. This feature is useful for arranging multiple units in an array. When one unit moves in the vicinity of the singularity point, it is effectively disengaged from other units, so that it may not be a load for the other units which are producing forces. Using these features of buckling actuators, multi-unit actuators with minimal mechanical conflict for achieving large bi-polar displacement and improved force-displacement characteristics are generated.

Dual-Unit Translational Buckling Actuator
Phased Array Actuation

Two buckling actuator units may be arranged in parallel, as illustrated in FIGS. 3B and 3C. Each buckling unit 13 and 15 includes two input translational actuators 14 and 14a, as illustrated in FIGS. 3B and 3C. FIG. 9A illustrates a schematic view of a dual buckling actuator spatially in phase, according to an exemplary embodiment of the present inventive concept. FIG. 9B illustrates a schematic view of a dual buckling actuator spatially out of phase, according to an exemplary embodiment of the present inventive concept. A single-unit buckling actuator can essentially disengage from the system it is in when near the singularity point, so it is similarly possible to mechanically couple the output nodes of two units with coupler 24 and have them interfere very little with each when each is near its singularity point. If the two buckling actuator units 13 and 15 are in phase, as illustrated in FIG. 9A, then each buckling actuator unit 13, 15 is only disengaged when the other is as well. With the in-phase orientation of the buckling actuator units 13 and 15, the actuator does not take advantage of a single unit's ability to disengage from the other. However, if the two buckling actuator units 13 and 15 are out of phase, as illustrated in FIG. 9B, when one unit is near its singularity point, the other is capable of producing much greater force. Thus, when one unit can effectively disengage, the other unit can still influence the output load.

If the inactive equilibrium angle, $\theta_0$, as illustrated in FIG. 9B is small enough, then the buckling direction of the pair of buckling actuator units 13 and 15 may be controlled. FIG. 10A illustrates an asynchronous activation time sequence of a dual-unit phase shifted buckling actuator showing upward free displacement and FIG. 10B illustrates an asynchronous activation time sequence of a dual-unit phase shifted buckling actuator showing downward free displacement, in accordance with an exemplary embodiment of the present inventive concept. At $t_1$, both units are inactive in both FIGS. 10A and 10B. Control is possible, if activating one buckling actuator unit and not the other will force the output node of the inactive buckling actuator unit through its singularity point. In FIG. 10B, the top buckling actuator unit will tend to cause displacement of the top buckling unit in a downward direction when activated and the bottom buckling actuator unit will tend to cause displacement of the bottom buckling unit in an upward direction when activated. In FIGS. 10A and 10B, at time $t_2$, one buckling actuator unit is activated; the bottom unit is activated in FIG. 10A and the top buckling actuator unit is activated in FIG. 10B. In both cases, the active unit has forced the inactive unit through its singularity position. Once the output nodes of both units are on the same side of their respective singularity points, activating both causes further displacement, as illustrated at time $t_3$ in FIGS. 10A and 10B. This requires the top and bottom buckling actuator units to be activated asynchronously or temporally out of phase. FIGS. 10A and 10B demonstrate that the phased activation can move the output nodes up or down. Thus, the phased array actuator utilizes both being out of phase spatially and being activated out of phase temporally.

Dual-Unit Actuator Simulation

As with the simulation for the single unit buckling actuator, the series stiffnesses of the piezoelectric actuators and compressive stiffness of the joints are modeled as springs, while the activation levels of the piezoelectric actuators are modeled as effectively changing the rest length of those springs. The potential energy values for three activation scenarios are shown in FIGS. 11A-C. FIG. 11A is a graph of potential energy versus displacement of a dual-unit out-of-phase actuator when both buckling actuator units are inactive, in accordance with an exemplary embodiment of the present inventive concept. FIG. 11B is a graph of potential energy versus displacement of a dual-unit out-of-phase actuator when a left buckling actuator unit is active, in accordance with an exemplary embodiment of the present inventive concept. FIG. 11C is a graph of potential energy versus displacement of a dual-unit out-of-phase actuator when both buckling actuator units are active In accordance with an exemplary embodiment of the present inventive concept. The graphs show the potential energy for two different values of the rest angle $\theta_0$, namely, 0.3 degrees and 1.0 degrees.

When both buckling actuator units are inactive, as illustrated in FIG. 11A, there is a single potential energy well at zero displacement. Regardless of the output position, there is a restoring force to the zero displacement position. That is, even if the output node of one of the units was extended beyond its singularity point, the actuator would still provide a restoring force. This is true regardless of the rest angle $\theta_0$.

When a single buckling actuator unit is active, as illustrated in FIG. 11B, there is a nonzero slope in the potential energy function at a displacement value of zero. That is, at the rest position, the output nodes will be forced in one direction. In FIG. 11B for $\theta_0=1.0$ degrees, there is only one energy well, indicating that there exists just one unforced stable position because this particular embodiment is such that there is always a force toward a preferred side of the rest position. However, in one embodiment, two energy wells are generated, one on either side of the rest position, if the rest angle $\theta_0$ is smaller, as illustrated in FIG. 11B for $\theta_0=0.3$ degrees. Although, even with two equilibrium positions, the slope of the energy curve at the rest position is still nonzero, and the output would be forced in a preferred direction if it were at the rest position. By using an embodiment with just one energy well, more control over the output is achieved, but at the cost of efficiency because a greater amount of energy from the input actuators is converted to strain energy within the actuator when both buckling actuator units are activated as illustrated in FIG. 11C.

When both buckling actuator units are active, two symmetric unforced equilibrium points exist. The equilibrium displacements from activating both buckling actuator units are greater in magnitude than the equilibrium point of greatest magnitude (whether 1 or 2) from activating just one buckling actuator unit. Also, the maximum force is greater with both buckling actuator units active than with just one buckling actuator unit active. This is illustrated by the maximum negative mid-stroke slope in FIG. 11C being greater than the maximum negative mid-stroke slope of FIG. 11C. Thus, the simulation shows that activating one buckling actuator unit, followed by the other after the output is beyond the zero displacement point, is a method of controlling the buckling direction of the buckling actuator unit.

Multi-Unit Translational Buckling Actuator

Figure 12A:
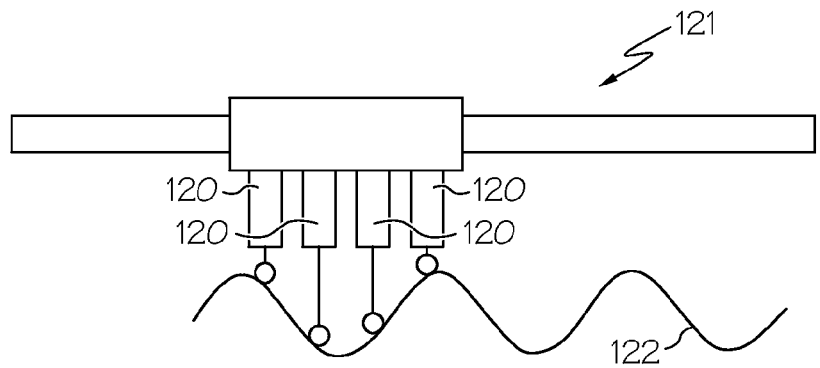
FIG. 12A is a schematic view of multiple linear actuators used to generate continuous translational motion.
Figure 12B:
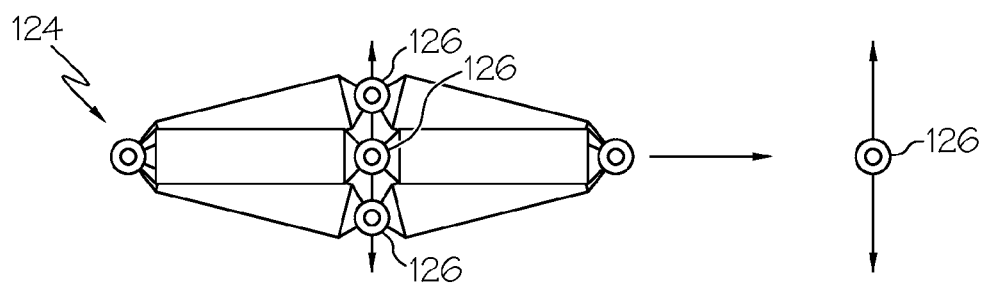
FIG. 12B illustrates a schematic view of a single buckling actuator unit of multiple buckling actuators used to generate continuous translational motion as an output node that can move up and down.
Figure 12C:
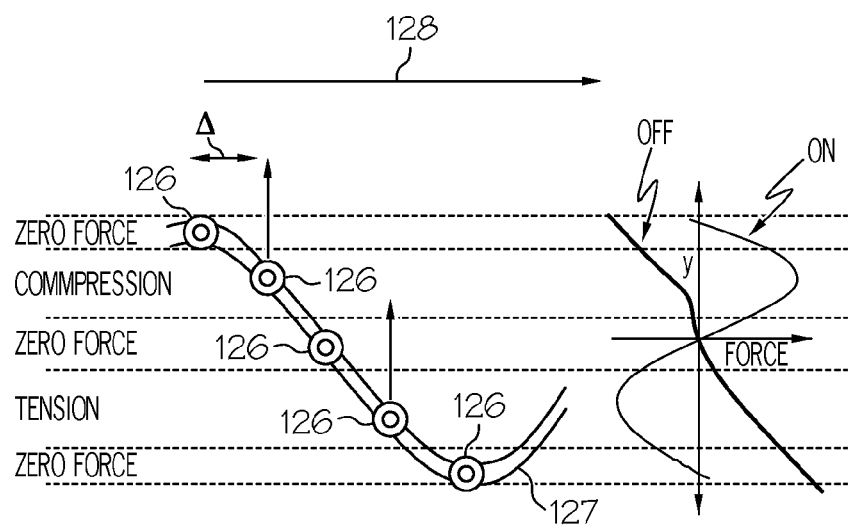
FIG. 12C is a plot of an output of each buckling unit of the multiple buckling actuators of FIG. 12B moving up and down within a track that is constrained to move horizontally, in accordance with an exemplary embodiment of the present inventive concept.

Spatially distributed multiple buckling units can generate translational motion when the multiple units are coordinated. FIG. 12A illustrates a schematic view of multiple linear actuators used to generate continuous translational motion. FIG. 12B illustrates a schematic view of a single buckling actuator unit of multiple buckling actuators used to generate continuous translational motion as an output node that can move up and down. FIG. 12C illustrates a plot of an output of each buckling unit of the multiple buckling actuators of FIG. 12B moving up and down within a track that is constrained to move horizontally, in accordance with an exemplary embodiment of the present inventive concept. FIG. 12A illustrates a mechanism 121 in which a group of linear actuators 120 are engaged with a wavy track 122 to push the surface in a coordinated manner. A thrust can be generated in the horizontal direction as the actuators 120 are synchronized in phase with the wave location. This principle can be applied to the buckling actuators, as illustrated in FIGS. 12B and 12C.

A single buckling unit 124 is diagramed simply as an output node 126 that can move up and down in FIG. 12B. In FIG. 12C, the output of each buckling actuator unit 124 moves up and down, within a track 127 that is constrained to move horizontally. Because the output nodes 126 are engaged with the track 127, but free to slide within it, the track is forced right or left by the up or down motion of the buckling units 124. The buckling actuator unit 124 generates a displacement large enough to pass a wave of the track 127. For the half period section of track 127 shown, upward force from the buckling actuator units 124 will force the track 127 to the right in the track direction 128.

By using multiple units, the units can provide a net thrust on the track at any distance the track has moved, and assist each other in passing through respective singularity points.

There are four types of zones that are repeated cyclically along the track 127 that are illustrated in FIG. 12C. Next to the track 127 in FIG. 1C, there is a plot of the force each buckling unit can impart on the track 127 as a function of its position y for both active ON and inactive OFF states. As illustrated in the force plot and track diagram, there are two types of zones along the track at which the buckling units cannot produce thrust, which are labeled as Zero Force. One Zero Force zone occurs when the buckling actuator unit 124 is near its singularity position in the middle of the track 127. The buckling actuator unit 124 cannot produce a force at the singularity position. The other Zero Force zone occurs at the maximum displacement of buckling actuator unit 124 where the rail has zero slope and cannot be forced left or right by a buckling actuator unit. The two other zones are high force zones. The zone labeled Compression in FIG. 12C is where a buckling actuator unit 124 is actively in compression, forcing away from its singularity position. The other zone labeled Tension is where an inactive buckling actuator unit 124 is in tension, forcing towards its singularity position. An inactive buckling actuator unit 124 may go through its singularity position, since it is engaged with the track 127 that pushes the inactive unit across the singularity position. These forcing zones alternate between the compression and tension zones and vice versa when the forcing direction on the track is reversed.

It is desirable to be able to force the track 127 in either direction at all possible track positions. This is accomplished by phasing the position of the buckling actuator units 124 along the track 127 by a distance $\Delta$ as illustrated in FIG. 12C. The Compressive zones are repeated along the track 127 twice for every period of the track 127. So for four units, the phase shift is $\frac{1}{8}+n/2$ times the periodic length of the track, where n is any integer. This phase shift ensures that one buckling actuator unit is in each of the four zones described above for all positions of the track. Thus, the buckling actuator units are capable of forcing the track in either direction for all track positions. The track progresses left or right depending on the temporally phased activation of the buckling actuator units.

Figure 13:
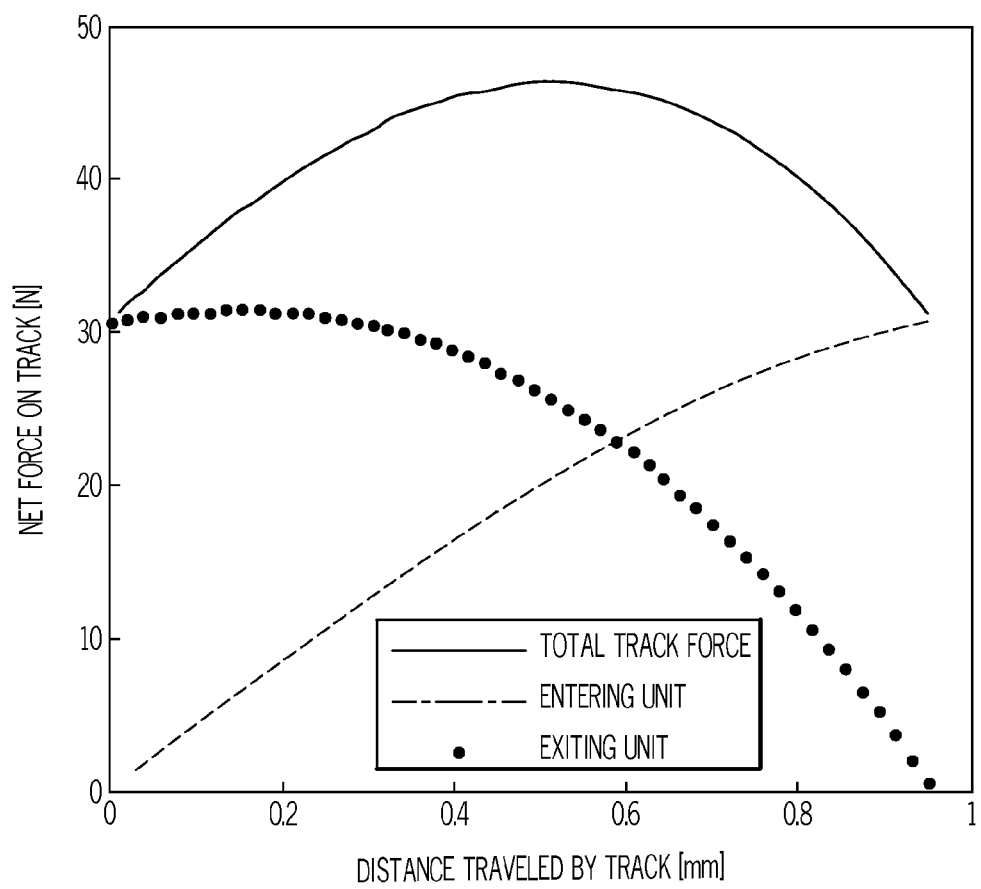
FIG. 13 is a graph of one period of the force displacement relationship for the multi-unit translational buckling actuator, in accordance with an exemplary embodiment of the present inventive concept.

FIG. 13 is a graph of one period of the force displacement relationship for the multi-unit translational buckling actuator, in accordance with an exemplary embodiment of the present inventive concept. The performance of the phase arrayed multi-unit track actuator is illustrated in FIG. 13. Potential energy based simulation is used to generate the force displacement relationship in FIG. 13. For this simulation, ideal force transmission from the buckling actuators units to the track is assumed. That is, it is assumed that the track is very stiff compared to the buckling actuator units, does not store strain energy, and that friction is neglected. It is also assumed that zero tensile force from the buckling actuator units is contributed to the net force on the track. A track with a constant slope of one is also assumed, however altering the shape of the track can be used to shape the output force-displacement relationship for specific applications.

As the track progresses, the four buckling actuator units transition into their next respective zones. Since one unit is in each zone at all track positions, the force-displacement curve repeats for each transition. A transition occurs for every $\frac{1}{8}$ of a period length of the track.

Only units in the compression zones contribute force to the track. As one buckling actuator unit leaves a compression zone, another buckling actuator unit enters a compression zone. Therefore, the net force on the track is the combination of two buckling actuator units at any given time, as illustrated in FIG. 13. FIG. 13 illustrates simulation of one period of the force displacement relationship for the multi-unit translational buckling actuator. The curve gradually rising is the force contribution of the buckling actuator unit entering a high force compression zone, and the curve that drops to zero force is the force contribution of the buckling actuator unit leaving the high force compression zone.

FIG. 13 illustrates that there is a force ripple as the track progresses. This ripple is repeated eight times per period of the track, once for each time the buckling actuator units enter a different zone on the track. This ripple can be shaped in two ways. First, the shape of the track may be something other than a constant slope. The instantaneous track slope is the value of the force transmission ratio from a buckling actuator unit to the track. Secondly, more buckling actuator units may be used to decrease the relative magnitude of the ripple, and increase the ripple frequency.

In one exemplary embodiment, an array of PZT actuators pushes gear teeth one by one so that the gear can rotate continually. Without effective strain amplification mechanisms, the stroke of PZT stacks is too small to go over each tooth. For example, an ultrasonic motor using a piezoelectric ceramic array does not use a gear, but uses a friction drive mechanism. Such an actuator is limited to small load applications and it is not usable for large loads or varying loads. Friction is difficult to regulate with preload or pressure applied to the piezoelectric device. Unwanted slip and breakage cannot be prevented with friction drives. Furthermore, ultrasonic motors with friction drives are not backdriveable at all. In addition, ultrasonic motors with friction drives have no stiffness control or energy harvesting capabilities. The friction drives cannot bear a load larger than friction; they simply slip when the back driving force exceeds the friction. Pushing each gear tooth is, therefore, a more reliable means that is especially advantageous for large load applications. In an exemplary embodiment in which the height of a gear tooth that is on the order of one millimeter, an amplification gain of PZT on the order of 100 times is required.

Figure 14:
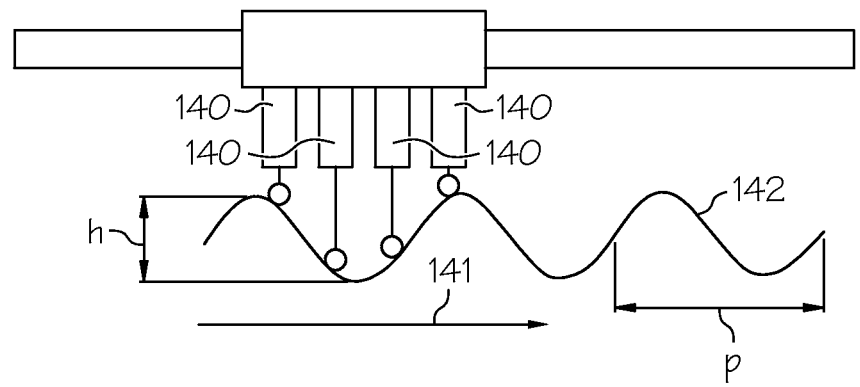
FIG. 14 is a schematic view of an array of PZT buckling actuator units engaged with a gear, in accordance with an exemplary embodiment of the present inventive concept.

The buckling actuator of an exemplary embodiment of the present inventive concept meets this requirement in a single stage amplification flexure. FIG. 14 illustrates a schematic view of an array of PZT buckling actuator units 140 engaged with a gear 142. FIG. 14 illustrates phased array actuators 140 engaged with gear teeth of a gear 142. In one embodiment, a tooth height h is approximately 2~10 mm. Assuming a strain amplification gain of 100, the required stroke can be achieved for PZT actuators; a PZT stack of 20~100 mm stack length can produce 20~100 μm of output displacement. Multiplying the PZT stack displacement by 100 generates a 2~10 mm stroke. The gear 142 has a pitch p. As shown in FIG. 14, multiple PZT buckling actuator units 140 are distributed along the horizontal axis having different phase angles. For example, FIG. 14 shows four PZT units placed 90 degrees apart. By activating these units with a proper phase shift, a horizontal displacement between the actuator block and the gear teeth in a track direction 141 may be generated. The traction force in the horizontal direction is determined by the slope of the gear tooth surface and friction at the moving parts.

Multi-Unit Rotational Buckling Actuator

Figure 15A:
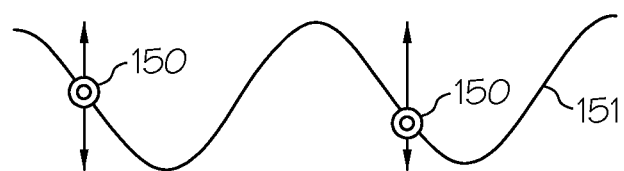
FIG. 15A is a schematic view of a translational track for continuous motion multi-unit buckling actuators, in accordance with an exemplary embodiment of the present inventive concept.
Figure 15B:
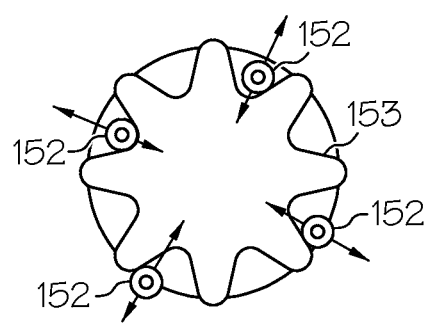
FIG. 15B is a schematic view of a rotational track for continuous motion multi-unit buckling actuators, in accordance with an exemplary embodiment of the present inventive concept.

The straight track with periodic ripples utilized in the previous translational actuator embodiment may be replaced with a recirculating track with periodic ripples utilized in a rotational actuator embodiment as illustrated in FIG. 15B. FIG. 15A illustrates a schematic view of a translational track for continuous motion multi-unit buckling actuators, in accordance with an exemplary embodiment of the present inventive concept. FIG. 15B illustrates a schematic view of a rotational track for continuous motion multi-unit buckling actuators, in accordance with an exemplary embodiment of the present inventive concept. The translational track 151 of FIG. 15A incldes buckling actuator units 150 engaged with the translational track 151.

The method of applying a force to the rotational track of FIG. 15B with multiple buckling actuator units 152 is similar to the method used for applying a force to the translational track, as illustrated in FIGS. 14 and 15A. In FIG. 15B, multiple buckling actuator units 152 are positioned around a track 153 with a phase shift equal to half the ripple period divided by the number of buckling actuator units used. The rotational track may be a rigid gear.

The rotational actuator of FIG. 15B is similar to the harmonic drive gearing mechanism of FIG. 4B. A harmonic drive includes a wave generator driving a flex spline within a rigid circular spline. Similarly, the rotational buckling actuator has a rigid internal spline/track with buckling actuator units providing a flex-spline-like interaction with the internal spline. Instead of being driven by a wave generator as in the harmonic drive, the buckling actuator units 152 are activated with specified temporal phase shifts to generate the wave-like motion along the rigid internal gear 153.

Figure 16:
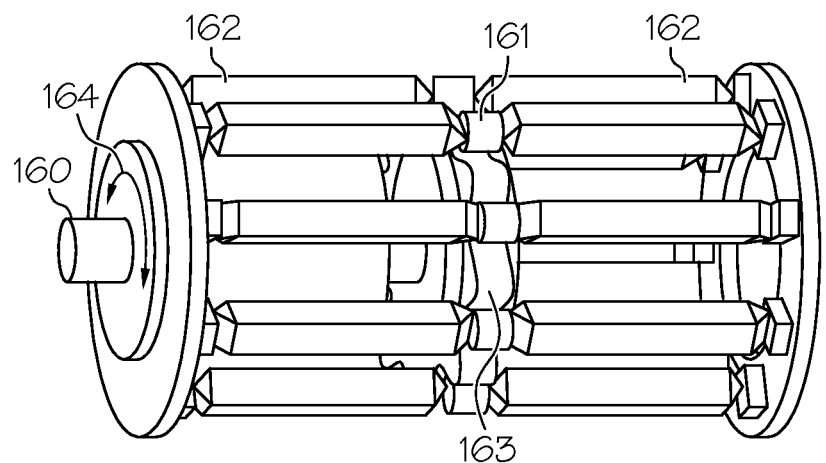
FIG. 16 is a perspective view of a multi-unit phase shifted rotational buckling actuator.

FIG. 16 is a perspective view of a multi-unit phase shifted rotational buckling actuator. The actuator shown in FIG. 16 is a multi-unit rotational buckling actuator including eight buckling units 161 driving a rigid internal track 163 constrained to freely rotate. The output nodes of the buckling actuator units are constrained to follow the track 163. The track 163 has an oscillation period of ¼ π radians. The buckling actuator units 161 are phase shifted by 1/16 of the track period. 1/16 of the track period in this case is 1/64 π radians.

In FIG. 16, the phase arrayed buckling actuator units 161 surround the rotational track/gear 163. Each buckling actuator unit makes contact with the gear 163 near the middle of a gear shaft 160. If the buckling actuator unit support plates 162 are grounded and the gear shaft 160 is free to rotate, then the gear shaft 160 will be rotated, as illustrated by arrow 164 by the temporally phased activation of the buckling actuator units 161. The gear shaft 160 in FIG. 160 is hollow. This hollow space within the actuator may be useful for any number of application specific reasons.

Figure 17:
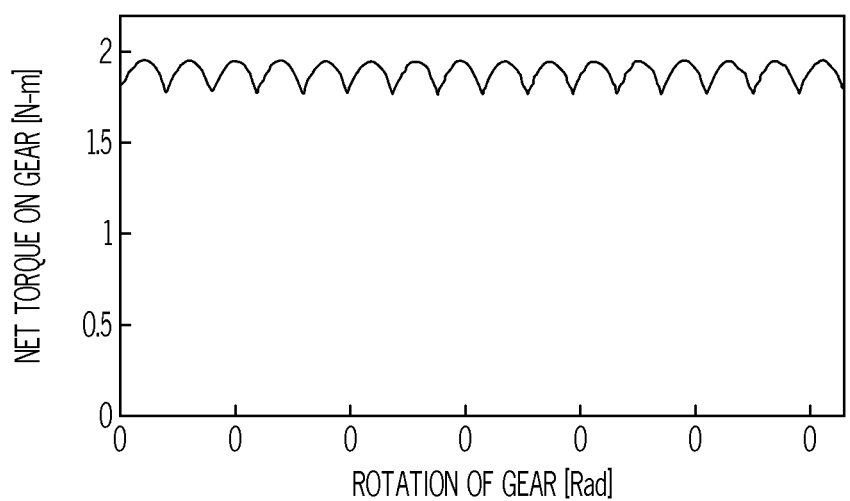
FIG. 17 is a graph of an output performance of a rotational buckling actuator unit through a full cycle of rotation, in accordance with an exemplary embodiment of the present inventive concept.

FIG. 17 is a graph of an output performance of a rotational buckling actuator unit through a full cycle of rotation, in accordance with an exemplary embodiment of the present inventive concept. As seen in FIG. 17, a torque ripple similar to the force ripple of the translational actuator occurs. The torque ripple may similarly be shaped and mitigated by shaping the gear and/or incorporating more buckling actuator units. The ratio of the torque ripple to the mean torque in FIG. 17 is much smaller than the ratio of the force ripple to the mean force in FIG. 13. This is because there are eight units acting out of phase in FIG. 17, rather than just four as in FIG. 13.

In utilizing multiple buckling actuator units in the rotational buckling actuator unit, there is a favorable tradeoff of frequency for displacement. The rotational buckling actuator unit is a frequency leveraged device because the PZT input actuators are activated at a frequency much higher than the output rotation frequency. With the eight period/tooth gear, the buckling actuator units must cycle eight times for one revolution of the output shaft. The natural frequency of a single buckling actuator unit of the type simulated in the rotational buckling actuator unit is more than 50 Hz. This means an output rotational frequency of 6.25 Hz.

By including a gear reducer within the hollow section of the rotational buckling actuator unit, substantial torque may be produced to be used in industrial scale applications.

Figure 18:
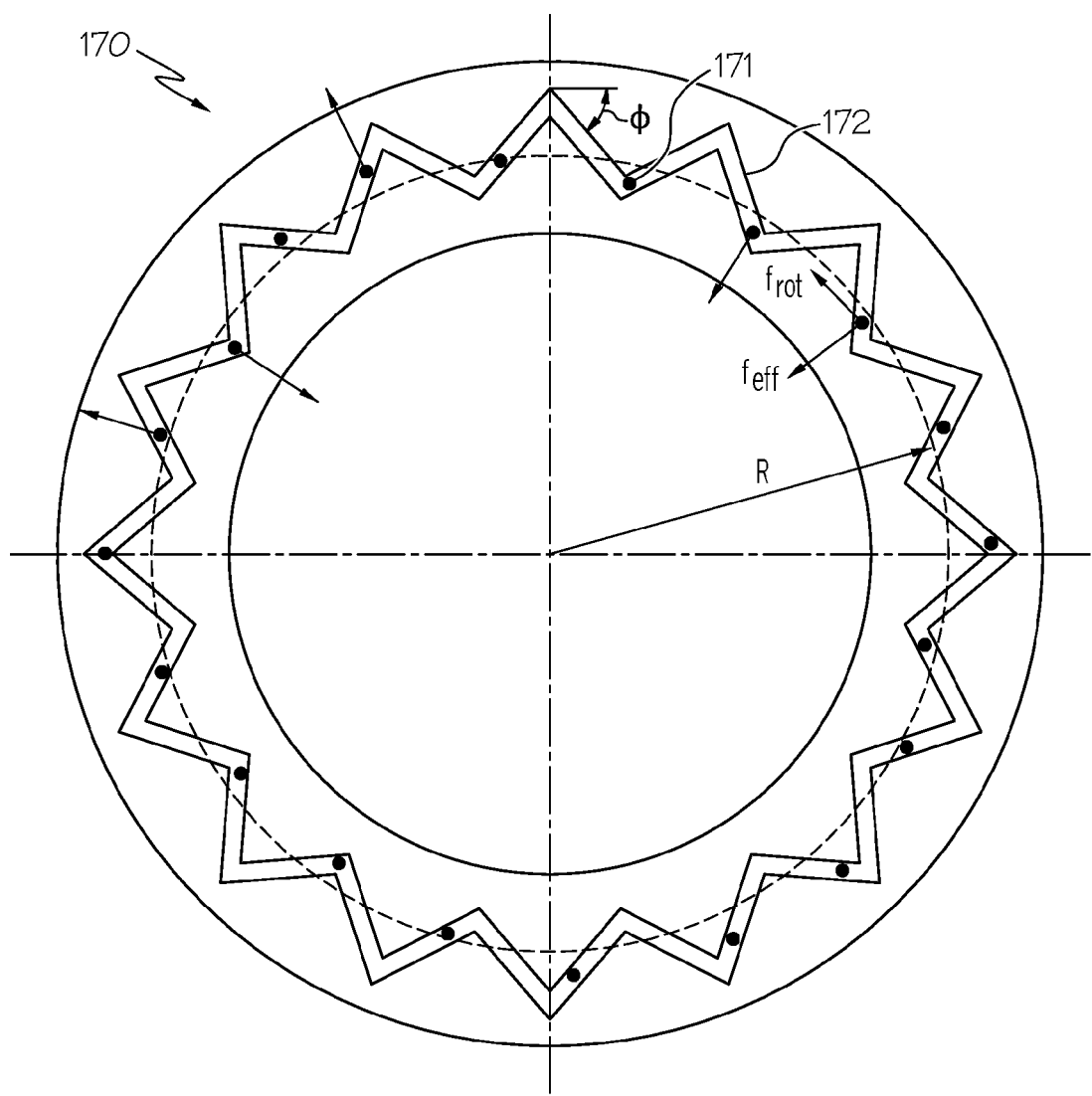
FIG. 18 illustrates a cross-sectional view of a harmonic actuator, in accordance with an exemplary embodiment of the present inventive concept.

FIG. 18 illustrates a cross-sectional view of a harmonic actuator 170 with twenty PZT buckling actuator units 171 and sixteen teeth 172. In FIG. 18, n is the number of PZT buckling actuator units 171 arranged in a circulatory manner, and m is the number of teeth around a gear of pitch radius R. For simplicity the slope of the gear tooth 172 is constant at angle φ as shown in the FIG. 18. If each PZT buckling actuator unit 171 produces an effective force $f_{\mathit{eff}}$, then the force in the circumference direction is given by:

$$f_{rot} = f_{\mathit{eff}} \tan \phi,$$

assuming no friction. The resultant torque generated by n PZT buckling actuator units is then given by:

$$T = R \zeta n f_{\mathit{eff}} \tan \phi,$$

where ζ is a duty rate, namely, the number of PZT buckling actuator units contributing to torque generation divided by the total number of PZT buckling actuator units n. Since PZT stacks cannot generate contractile forces, at most 50% of the buckling actuator units can contribute to generating the torque. Assume ζ=0.4 in this example. One of the largest PZT stacks may produce a 170 N peak force. On average, it may be assumed that the effective force is on the order of $f_{eff}$=100N. Setting R=200 mm and φ=45°, the torque of the harmonic buckling actuator with twenty PZT buckling actuator units is given by:

$$T=0.2m \times 0.4 \times 20 \times 100N \times 1=160Nm,$$

PZT stacks have a high bandwidth, as described previously. With a strain amplification flexure, this bandwidth decreases, but 100 Hz bandwidth is achievable. That is, if the number of teeth is m=18, the output shaft of the harmonic buckling actuator may rotate at an angular velocity of ω=100/18=5.56 Hz=34.9 rad/s, producing an output power of $$P=T\omega=5.58 \text{ kW}$$

FIGS. 19A-D illustrate a high power-density PZT harmonic actuator. FIGS. 19A and 19B are cross-sectional, perspective views of the high power-density PZT harmonic actuator. FIG. 19C is a cross-sectional, perspective view of an inner hollow gear shaft 180. FIG. 19D is a cross-sectional, perspective view of an outer casing 182 with imbedded PZT buckling actuator units. As shown in FIGS. 19A-D, the PZT harmonic actuator can be a compact, high energy-density actuator with the unique hollow gear shaft 180 structure. The hollow space within the harmonic actuator may be useful for any number of purposes. For example, the harmonic actuator may wrap around an object or the hollow space may be used to run wires through. As illustrated in FIG. 19C, the inner hollow gear shaft 180 has a track/gear 183. The imbedded PZT buckling actuator units 185 of the outer casing 182 surround the rotational track/gear 183. Each buckling actuator unit makes contact with the track/gear 183 near the middle of the hollow gear shaft 180. If the buckling actuator unit support plates are grounded and the gear shaft is free to rotate, then the gear shaft will be rotated by the temporally phased activation of the buckling actuator units. Instead of being driven by a wave generator, the buckling actuator units are activated with specified temporal phase shifts to generate the wave-like motion along the rigid internal gear. The buckling actuator units have pronounced nonlinearities, which must be taken into account.

Basic Energy Harvesting Principle Using Piezoelectric Devices

Power efficiency and energy issues are important for today's actuators. The piezoelectric devices of an example embodiment of the present inventive concept have unique advantages in both energy efficiency and power re-generation/harvesting. Cellular PZT actuators with harmonic buckling actuators are highly backdriveable. Energy can be transmitted backward from the load to the actuator/generator with only a small fraction of power loss due to friction. The harmonic buckling actuators can utilize energy harvesting.

The buckling actuator units of the exemplary embodiments of the present inventive concept utilize the properties of the piezoelectric ceramics, namely, high power density, high stress, high bandwidth, compactness, reliability and stability. In addition, the buckling actuator units of the exemplary embodiments of the present inventive concept utilize the bi-directional interactive actuators which provide tunable impedance, power recovery, energy harvesting, high efficiency, low friction and backdriveability. The buckling actuator units of the exemplary embodiments of the present inventive concept may be used in harmonic buckling actuators and muscle actuators and other applications. The harmonic buckling actuators may have high torque, imbedded gear reducers, zero backlash, charge recovery, hollow shafts and may be backdriveable. The muscle actuators may have low friction, variable stiffness, and soft actuation and may be backdriveable. In addition, the buckling actuator units have a number of application areas. For example, the buckling actuator units may be utilized in rehabilitation training, resonant actuation and energy harvesting, deep water robots, end effecters, power suits and wearable rehabilitation equipment and robotic vehicles.

While this invention has been particularly shown and described with references to preferred embodiments thereof, it will be understood to those skilled in the art that various changes in form and details may be made herein without departing from the spirit and scope of the invention as defined in the appended claims.

What is claimed is:

1. A displacement amplification device, comprising:
    a first buckling actuator unit tending to cause displacement of the first buckling actuator unit in a first direction when activated; and
    a second buckling actuator unit tending to cause displacement of the second buckling actuator unit in a second direction when activated;
    wherein asynchronous activation of the first and second buckling actuator units controls buckling direction and wherein one of the first and second buckling actuator units is forced beyond a zero displacement point by the other of the first and second buckling actuator units.

2. The displacement amplification device of claim 1, wherein the first and second buckling actuator units each comprise:
    first and second input linear actuators;
    a first rotational joint rigidly coupling one end of the first input linear actuator to a common ground;
    a second rotational joint rigidly coupling one end of the second input linear actuator to the common ground; and
    a third rotational joint coupling the other end of each of the first and second input linear actuators to each other.

3. The displacement amplification device of claim 2, wherein the first and second input linear actuators are piezoelectric actuators.

4. A displacement amplification device, comprising:
    a plurality of buckling actuator units, wherein asynchronous activation of the plurality of buckling actuator units controls displacement direction,
    wherein each of the buckling actuator units comprises:
        first and second input linear actuators;
        a first rotational joint rigidly coupling one end of the first input linear actuator to a common ground;
        a second rotational joint rigidly coupling one end of the second input linear actuator to the common ground; and
        a third rotational joint coupling the other end of each of the first and second input linear actuators to each other,
        wherein the third rotational joint is coupled and arranged such that the third rotational joint displaces in either direction across a line defined by the first and second rotational joints with zero displacement being defined by the third rotational joint lying on the line defined by the first and second rotational joints,
    wherein the third rotational joints of first and second buckling actuator units of the plurality of buckling actuators units are free to move in the same plane and are mechanically coupled to each other.

5. The displacement amplification device of claim 4, wherein activating the first buckling actuator unit of the plurality of buckling actuators units forces the second buckling actuator unit of the plurality of buckling actuator units from one side to the other of the zero displacement point of the second buckling actuator unit.

6. The displacement amplification device of claim 4, wherein the first and second buckling actuator units are spatially out of phase.

7. The displacement amplification device of claim 4, wherein the first and second input linear actuators of the first and second buckling actuator units are at a non-zero angle to the line defined by the first and second rotational joints of the first and second buckling actuator units, respectively, in an inactive state.

8. The displacement amplification device of claim 4, wherein the third rotational joints of the first and second buckling actuator units are both inside or both outside the lines defined by the first and second rotational joints of the first and second buckling actuator units.

9. The displacement amplification device of claim 4, wherein the lines defined by the first and second rotational joints of the first and second buckling actuator units are in parallel.

10. The displacement amplification device of claim 4, wherein an output displacement axes of each of the first and second buckling actuator units are collinear.

11. The displacement amplification device of claim 4, wherein the first and second buckling actuator units are substantially identical.

12. The displacement amplification device of claim 4, wherein an inactive, unforced minimum distance between the third rotational joint and the line defined by the first and second rotational joints in each of the first and second buckling actuator units are equal.

13. The displacement amplification device of claim 4, wherein the first and second input linear actuators are piezoelectric actuators.

14. A displacement amplification device, comprising:
a plurality of buckling actuator units, wherein asynchronous activation of the plurality of buckling actuator units controls displacement direction,
wherein each of the buckling actuator units comprise:
first and second input linear actuators;
a first rotational joint rigidly coupling one end of the first input linear actuator to a common ground;
a second rotational joint rigidly coupling one end of the second input linear actuator to the common ground; and
a third rotational joint coupling the other end of each of the first and second input linear actuators to each other,
wherein the third rotational joint is coupled and arranged such that the third rotational joint buckles in either direction across a line defined by the first and second rotational joints, and
wherein the plurality of buckling actuator units are engaged to a track and are harmonically activated to generate net force on the track.

15. The displacement amplification device of claim 14, wherein the track is gear-shaped such that the force generated by the buckling actuator units generates a torque output.

16. The displacement amplification device of claim 15, wherein the gear-shaped track is coupled to a slow speed shaft of a gear reducer.

17. The displacement amplification device of claim 16, wherein a gear box of the gear reducer is rigidly coupled to the common ground shared by the individual buckling actuator units.

18. The displacement amplification device of claim 16, wherein the gear reducer is encompassed by the gear-shaped track.

19. The displacement amplification device of claim 14, wherein the plurality of buckling actuator units are equally spaced apart along the track.

20. The displacement amplification device of claim 14, wherein the first and second input linear actuators are piezoelectric actuators.

21. A method of controlling a displacement direction of a displacement amplification device, comprising:
providing a plurality of buckling actuator units;
activating a first buckling actuator unit of the plurality of buckling actuator units such that a second buckling actuator unit of the plurality of buckling actuator units is forced from one side to the other of a zero displacement point of the second buckling actuator unit; and
activating the second buckling actuator unit such that a magnitude of the displacement of the first and second buckling actuator units is increased.

22. The method of claim 21, wherein each of the plurality of buckling actuator units comprise:
first and second input linear actuators;
a first rotational joint rigidly coupling one end of the first input linear actuator to a common ground;
a second rotational joint rigidly coupling one end of the second input linear actuator to the common ground; and
a third rotational joint coupling the other end of each of the first and second input linear actuators to each other.

23. The method of claim 22, wherein the third rotational joints of the first and second buckling actuator units are free to move in the same plane and are mechanically coupled to each other.

24. The method of claim 22, wherein when the first and second buckling actuator units are inactive, the first and second input linear actuators of the first and second buckling actuator units are at an angle to a line defined by the first and second rotational joints of the first and second buckling actuator units, respectively.

* * * * *